US010182695B2

(12) United States Patent
Halloran et al.

(10) Patent No.: US 10,182,695 B2
(45) Date of Patent: Jan. 22, 2019

(54) ROBOT SYSTEM

(71) Applicant: iRobot Corporation, Bedford, MA (US)

(72) Inventors: Michael J. Halloran, Bedford, MA (US); Jeffrey W. Mammen, Westford, MA (US); Tony L. Campbell, Stoneham, MA (US); Jason S. Walker, Medford, MA (US); Paul E. Sandin, Brookline, NH (US); John N. Billington, Jr., Georgetown, MA (US); Daniel N. Ozick, Newton, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 15/880,767

(22) Filed: Jan. 26, 2018

(65) Prior Publication Data

US 2018/0146833 A1    May 31, 2018

Related U.S. Application Data

(63) Continuation of application No. 15/417,997, filed on Jan. 27, 2017, now Pat. No. 9,901,236, which is a (Continued)

(51) Int. Cl.
*A47L 11/40* (2006.01)
*B25J 13/00* (2006.01)
(Continued)

(52) U.S. Cl.
CPC ............ *A47L 11/4011* (2013.01); *A47L 5/30* (2013.01); *A47L 9/009* (2013.01); *A47L 9/0411* (2013.01);
(Continued)

(58) Field of Classification Search
CPC .. A47L 11/4011; A47L 9/1409; A47L 9/0411; A47L 9/0477; A47L 9/0488;
(Continued)

(56) References Cited

U.S. PATENT DOCUMENTS 4,829,442 A    5/1989   Kadonoff et al.
5,432,907 A    7/1995   Picazo et al.
(Continued)

FOREIGN PATENT DOCUMENTS

EP       1553472       7/2005
JP       H10174669     6/1998
(Continued)

OTHER PUBLICATIONS

Doty et al., "Sweep Strategies for a Sensory-Driven, Behavior-Based Vacuum Cleaning Agent," AAAI 1993 Fall Symposium Series, Instantiating Real-World Agents, pp. 1-6, Oct. 22-24, 1993.
(Continued)

*Primary Examiner* — Jaime Figueroa
(74) *Attorney, Agent, or Firm* — Fish & Richardson P.C.

(57) ABSTRACT

A power-saving robot system includes at least one peripheral device and a mobile robot. The peripheral device includes a controller having an active mode and a hibernation mode, and a wireless communication component capable of activation in the hibernation mode. A controller of the robot has an activating routine that communicates with and temporarily activates the peripheral device, via wireless communication, from the hibernation mode. In another aspect a robot system includes a network data bridge and a mobile robot. The network data bridge includes a broadband network interface, a wireless command interface, and a data bridge component. The data bridge component extracts serial commands received via the broadband network interface from an internet protocol, applies a command protocol thereto, and
(Continued)

broadcasts the serial commands via the wireless interface. The mobile robot includes a wireless command communication component that receives the serial commands transmitted from the network data bridge.

19 Claims, 11 Drawing Sheets

Related U.S. Application Data continuation of application No. 15/182,849, filed on Jun. 15, 2016, now Pat. No. 9,599,990, which is a continuation of application No. 14/275,355, filed on May 12, 2014, now Pat. No. 9,392,920, which is a continuation of application No. 13/893,905, filed on May 14, 2013, now Pat. No. 8,761,931, which is a continuation of application No. 12/959,879, filed on Dec. 3, 2010, and a continuation of application No. 11/633,883, filed on Dec. 4, 2006, now Pat. No. 8,374,721.

(60) Provisional application No. 60/741,442, filed on Dec. 2, 2005.

(51) Int. Cl.

| | | |
|---|---|---|
| *B25J 9/16* | (2006.01) | |
| *B25J 9/00* | (2006.01) | |
| *G05D 1/02* | (2006.01) | |
| *A47L 5/30* | (2006.01) | |
| *A47L 9/04* | (2006.01) | |
| *A47L 11/24* | (2006.01) | |
| *A47L 9/00* | (2006.01) | |
| *A47L 9/12* | (2006.01) | |
| *A47L 9/28* | (2006.01) | |
| *A47L 9/30* | (2006.01) | |
| *B60L 11/18* | (2006.01) | |
| *B60L 15/20* | (2006.01) | |
| *B25J 5/00* | (2006.01) | |
| *B25J 11/00* | (2006.01) | |
| *A47L 9/14* | (2006.01) | |
| *B60L 1/00* | (2006.01) | |
| *B60R 19/38* | (2006.01) | |
| *H04L 1/16* | (2006.01) | |
| *H04B 1/02* | (2006.01) | |
| *H04B 1/06* | (2006.01) | |

(52) U.S. Cl.
CPC .......... *A47L 9/0466* (2013.01); *A47L 9/0477* (2013.01); *A47L 9/0488* (2013.01); *A47L 9/12* (2013.01); *A47L 9/1409* (2013.01); *A47L 9/2826* (2013.01); *A47L 9/2852* (2013.01); *A47L 9/2857* (2013.01); *A47L 9/2894* (2013.01); *A47L 9/30* (2013.01); *A47L 11/24* (2013.01); *A47L 11/40* (2013.01); *A47L 11/4013* (2013.01); *A47L 11/4041* (2013.01); *A47L 11/4061* (2013.01); *A47L 11/4072* (2013.01); *B25J 5/007* (2013.01); *B25J 9/0003* (2013.01); *B25J 9/1666* (2013.01); *B25J 9/1694* (2013.01); *B25J 11/0085* (2013.01); *B25J 13/006* (2013.01); *B60L 1/003* (2013.01); *B60L 11/1805* (2013.01); *B60L 11/1816* (2013.01); *B60L 15/2036* (2013.01); *B60R 19/38* (2013.01); *G05D 1/028* (2013.01); *G05D 1/0225* (2013.01); *G05D 1/0227* (2013.01); *G05D 1/0234* (2013.01); *G05D 1/0242* (2013.01); *G05D 1/0255* (2013.01); *G05D 1/0272* (2013.01); *G05D 1/0274* (2013.01); *A47L 2201/00* (2013.01); *A47L 2201/04* (2013.01); *B60L 11/1825* (2013.01); *B60L 2200/40* (2013.01); *B60L 2250/10* (2013.01); *B60L 2250/16* (2013.01); *B60L 2260/32* (2013.01); *G05D 2201/0203* (2013.01); *G05D 2201/0215* (2013.01); *H04B 1/02* (2013.01); *H04B 1/06* (2013.01); *H04L 1/16* (2013.01); *Y02P 90/60* (2015.11); *Y02T 10/645* (2013.01); *Y02T 10/7005* (2013.01); *Y02T 10/7072* (2013.01); *Y02T 10/72* (2013.01); *Y02T 10/7258* (2013.01); *Y02T 10/7275* (2013.01); *Y02T 90/14* (2013.01); *Y02T 90/16* (2013.01); *Y10S 901/01* (2013.01); *Y10S 901/50* (2013.01)

(58) Field of Classification Search
CPC .... A47L 9/2826; A47L 9/2852; A47L 9/2894; A47L 9/009; A47L 9/12; A47L 9/2857; A47L 9/30; A47L 11/40; A47L 9/0466; A47L 11/24; A47L 11/4013; A47L 11/4072; A47L 11/4061; A47L 11/4041; A47L 5/30; A47L 2201/04; A47L 2201/00; B60R 19/38; B60L 1/003; B60L 15/2036; B60L 11/1816; B60L 11/1805; B60L 11/1825; B60L 2200/40; B60L 2260/32; B60L 2250/16; B60L 2250/10; B25J 13/006; B25J 9/1666; B25J 5/007; B25J 9/1694; B25J 11/0085; B25J 9/0003; G05D 1/0234; G05D 1/028; G05D 1/0274; G05D 1/0272; G05D 1/0255; G05D 1/0242; G05D 1/0227; G05D 1/0225; G05D 2201/0215; G05D 2201/0203; Y02P 90/60; H04B 1/02; H04B 1/06; Y02T 90/16; Y02T 10/7072; Y02T 90/14; Y02T 10/7275; Y02T 10/645; Y02T 10/7005; Y02T 10/72; Y02T 10/7258; Y10S 901/50; Y10S 901/01; H04L 1/16
USPC .................................................. 700/245, 264
See application file for complete search history.

(56) References Cited

U.S. PATENT DOCUMENTS

| | | |
|---|---|---|
| 5,491,670 A | 2/1996 | Weber |
| 5,548,649 A | 8/1996 | Jacobson |
| 5,796,742 A | 8/1998 | Klotzbach et al. |
| 5,819,008 A | 10/1998 | Asama et al. |
| 5,940,346 A | 8/1999 | Sadowsky et al. |
| 6,006,275 A | 12/1999 | Picazo et al. |
| 6,279,001 B1 | 8/2001 | DeBettencourt et al. |
| 6,374,155 B1 | 4/2002 | Wallach et al. |
| 6,389,329 B1 | 5/2002 | Colens |
| 6,446,192 B1 | 9/2002 | Narasimhan et al. |
| 6,459,955 B1 * | 10/2002 | Bartsch ..................... A47L 9/00 700/245 |
| 6,504,610 B1 | 1/2003 | Bauer et al. |
| 6,532,404 B2 | 3/2003 | Colens |
| 6,594,844 B2 | 7/2003 | Jones |
| 6,690,134 B1 | 2/2004 | Jones et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,965,209 B2 | 11/2005 | Jones et al. |
| 7,155,308 B2 | 12/2006 | Jones |
| 7,173,391 B2 | 2/2007 | Jones et al. |
| 7,174,238 B1 | 2/2007 | Zweig |
| 7,188,003 B2 | 3/2007 | Ransom et al. |
| 7,196,487 B2 | 3/2007 | Jones et al. |

(56) References Cited

U.S. PATENT DOCUMENTS

| | | | |
|---|---|---|---|
| 7,250,907 | B2 | 7/2007 | Krumm et al. |
| 7,302,469 | B2 | 11/2007 | Motoyama et al. |
| 7,312,752 | B2 | 12/2007 | Smith et al. |
| 7,388,343 | B2 | 6/2008 | Jones et al. |
| 7,389,156 | B2 | 6/2008 | Ziegler et al. |
| 7,448,113 | B2 | 11/2008 | Jones et al. |
| 7,467,026 | B2 | 12/2008 | Sakagami et al. |
| 7,557,703 | B2 | 7/2009 | Yamada et al. |
| 7,571,511 | B2 | 8/2009 | Jones et al. |
| 7,636,982 | B2 | 12/2009 | Jones et al. |
| 7,751,936 | B2 | 7/2010 | Kim |
| 7,761,910 | B2 | 7/2010 | Ransom et al. |
| 7,761,954 | B2 | 7/2010 | Ziegler et al. |
| 7,853,645 | B2 | 12/2010 | Brown et al. |
| 2002/0016649 | A1 | 2/2002 | Jones |
| 2002/0081937 | A1 | 6/2002 | Yamada et al. |
| 2002/0095239 | A1 | 7/2002 | Wallach et al. |
| 2002/0120364 | A1 | 8/2002 | Colens |
| 2003/0025472 | A1 | 2/2003 | Jones et al. |
| 2003/0028286 | A1 | 2/2003 | Glenn et al. |
| 2003/0158628 | A1 | 8/2003 | Matsuoka et al. |
| 2004/0009777 | A1 | 1/2004 | Koskimies et al. |
| 2004/0019406 | A1* | 1/2004 | Wang ............... B25J 5/007 700/231 |
| 2004/0020000 | A1 | 2/2004 | Jones |
| 2004/0049317 | A1 | 3/2004 | Matsuoka et al. |
| 2004/0049877 | A1 | 3/2004 | Jones et al. |
| 2004/0098167 | A1 | 5/2004 | Yi et al. |
| 2004/0111184 | A1 | 6/2004 | Chiappetta et al. |
| 2004/0117846 | A1 | 6/2004 | Karaoguz et al. |
| 2004/0148419 | A1 | 7/2004 | Chen et al. |
| 2004/0160312 | A1 | 8/2004 | Fisher et al. |
| 2004/0170154 | A1 | 9/2004 | Carter et al. |
| 2004/0181706 | A1 | 9/2004 | Chen et al. |
| 2004/0187457 | A1 | 9/2004 | Colens |
| 2004/0207355 | A1 | 10/2004 | Jones et al. |
| 2004/0235468 | A1 | 11/2004 | Luebke et al. |
| 2005/0067994 | A1 | 3/2005 | Jones et al. |
| 2005/0068019 | A1* | 3/2005 | Nakamura ............... G06F 1/26 323/355 |
| 2005/0080514 | A1* | 4/2005 | Omote ............... G06N 3/008 700/253 |
| 2005/0096790 | A1* | 5/2005 | Tamura ............... G06N 3/008 700/245 |
| 2005/0144437 | A1 | 6/2005 | Ransom et al. |
| 2005/0150697 | A1* | 7/2005 | Altman ............... G06F 3/011 178/19.02 |
| 2005/0154795 | A1 | 7/2005 | Kuz et al. |
| 2005/0204717 | A1 | 9/2005 | Colens |
| 2005/0222933 | A1 | 10/2005 | Wesby |
| 2005/0258154 | A1 | 11/2005 | Blankenship et al. |
| 2005/0267826 | A1* | 12/2005 | Levy ............... B25J 9/1689 705/34 |
| 2005/0288079 | A1* | 12/2005 | Tani ............... A63F 9/001 463/1 |
| 2006/0020881 | A1 | 1/2006 | Szabo et al. |
| 2006/0025134 | A1 | 2/2006 | Cho et al. |
| 2006/0143295 | A1 | 6/2006 | Costa-Requena et al. |
| 2006/0146776 | A1 | 7/2006 | Kim |
| 2006/0161301 | A1 | 7/2006 | Kim |
| 2007/0042716 | A1 | 2/2007 | Goodall et al. |
| 2007/0266508 | A1 | 11/2007 | Jones et al. |
| 2008/0140255 | A1 | 6/2008 | Ziegler et al. |
| 2008/0155768 | A1 | 7/2008 | Ziegler et al. |
| 2008/0307590 | A1 | 12/2008 | Jones et al. |
| 2010/0049365 | A1 | 2/2010 | Jones et al. |
| 2010/0257690 | A1 | 10/2010 | Jones et al. |
| 2010/0257691 | A1 | 10/2010 | Jones et al. |
| 2010/0263158 | A1 | 10/2010 | Jones et al. |

FOREIGN PATENT DOCUMENTS

| | | |
|---|---|---|
| JP | 2002196821 | 7/2002 |
| JP | 2002199470 | 7/2002 |
| JP | 2002533797 | 10/2002 |
| JP | 2003534086 | 11/2003 |

OTHER PUBLICATIONS

Electrolux, "Welcome to the Electrolux trilobite," Retrieved from the Internet: URL<www.electroluxusa.com/node57.asp?currentURL=node142.asp%3F>. 2 pages, Mar. 2005.

Everett, H.R. (1995). Sensors for Mobile Robots. AK Peters, Ltd., Wellesley, MA.

Facts on Trilobite, webpage, Retrieved from the Internet: URL<http://trilobiteelectroluxse/presskit_en/model11335asp?print=yes&pressID=>. 2 pages, accessed Dec. 2003.

Hitachi: News release: "The home cleaning robot of the autonomous movement type (experimental machine)," Retrieved from the Internet: URL< www.i4u.com./japanreleases/hitachirobot.htm>. 5 pages, Mar. 2005.

Honda Motor Co., Ltd., English Translation of JP11212642, Aug. 9, 1999, 31 pages.

Jones, J., Roth, D. (Jan. 2, 2004). Robot Programming: A Practical Guide to Behavior-Based Robotics. McGraw-Hill Education TAB; 288 pages.

Karcher "Karcher RoboCleaner RC 3000," Retrieved from the Internet: URL<www.robocleaner.de/english/screen3.html>. 4 pages, Dec. 2003.

Karcher USA, RC3000 Robotic Cleaner, website: http://www.karcher-usa.com/showproducts.php?op=view prod¶m1=143 ¶m2=&param3=, 3 pages, accessed Mar. 2005.

Karcher, "Product Manual Download Karch", available at www.karcher.com, 16 pages, 2003.

Luo et al., "Networked intelligent robots through the Internet: Issues and Opportunities," Proceedings of the IEEE, Mar. 2003, 91(3):371-382.

Luo et al., "Development of a multibehavior-based mobile robot for remote supervisory control through the Internet," IEEE/ASME Transactions on Mechatronics, 2000, 5(4):376-385.

Prassler, et al., English Translation of DE19849978, Feb. 8, 2001, 16 pages.

Winfield et al., "The application of wireless local area network technology to the control of mobile robots," Microprocessors and Microsystems, 2000, vol. 23, pp. 597-607.

* cited by examiner

ROBOT SYSTEM

This application is a continuation of U.S. application Ser. No. 15/417,997, filed Jan. 27, 2017, which claims priority to U.S. application Ser. No. 15/182,849, filed Jun. 15, 2016, which claims priority to U.S. application Ser. No. 14/275,355, filed May 12, 2014, which claims priority to U.S. application Ser. No. 13/893,905, filed May 14, 2013, which claims priority to U.S. application Ser. No. 12/959,879, filed Dec. 3, 2010, which claims priority to is a continuation of U.S. application Ser. No. 11/633,883, filed on Dec. 4, 2006, which claims priority under 35 U.S.C. 119(e) to a U.S. provisional patent application filed on Dec. 2, 2005, entitled "ROBOT NETWORKING, THEMING AND COMMUNICATION SYSTEM" and having assigned Ser. No. 60/741,442, the entire contents of which are hereby incorporated by reference.

TECHNICAL FIELD

This invention relates to robot systems, and more particularly to power saving robot systems and robot system networks.

BACKGROUND

Autonomous robots are robots which can perform desired tasks so unstructured environments without continuous human guidance. Many kinds of robots are autonomous to some degree. Different robots can be autonomous in different ways. An autonomous coverage robot traverses a work surface without continuous human guidance to perform one or more tasks. In the field of home, office and/or consumer-oriented robotics, mobile robots that perform household functions such as vacuum cleaning, floor washing, patrolling, lawn cutting and other such tasks have been widely adopted. Autonomous coverage robot systems that include a coverage robot and peripheral devices are generally battery powered. As a result, the battery life of each component of the system affects the operability of the overall system.

SUMMARY

The present disclosure provides a robot which can communicate with a base station and/or internet site via wireless communications media, in one configuration using a wireless bridge adapted for connection directly to a home wired network to provide a direct presence and proxies for the robot, allowing the robot to be a fully functional network node.

In one aspect, a power-saving robot system includes at least one peripheral device to be placed in an environment and a mobile robot. The peripheral device includes a power supply, a wireless communication component, and a controller having an active mode in which the peripheral device is fully operative and a hibernation mode in which the peripheral device is at least partly inactive. The wireless communication component is capable of activation in the hibernation mode. The mobile robot includes a drive system that moves the robot about the environment, a wireless communication component, and a controller. The controller has an activating routine that communicates with the peripheral device via the wireless communication components and temporarily activates the peripheral device from the hibernation mode when the wireless communication components of the peripheral device and the robot come within range of one another.

In one implementation, the wireless communication components communicate with transmission wavelengths that permit the robot and the peripheral device to be outside a line of sight. Conversely, in another implementation, the wireless communication components communicate with transmission wavelengths that require the robot and the peripheral device to be within a line of sight. In one example, the peripheral device is precluded from altering modes from the hibernation mode to the active mode until a line of sight is present between the robot and the peripheral device.

The wireless communication components may communicate with a point-to-point protocol while excluding routing and may communicate commands interpretable by the peripheral device to initiate a function. In one example, the wireless transmission communicated by the robot wireless communication circuit includes identification information. Similarly, the wireless transmission communicated by the peripheral device wireless communication circuit may include identification information as well.

In some implementations, the peripheral device, while in the hibernation mode, occasionally listens for a robot ping. Also, while in the hibernation mode, the peripheral device occasionally polls for a quiet robot. In one example, the peripheral device is a base station. In another example, the peripheral device is a mobile device.

In another implementation, the robot measures a signal strength of a wireless transmission communicated by the wireless communication component of the peripheral device to determine a distance from the peripheral device. In one example, the wireless communication components communicate over a radiofrequency.

In some implementations, the controller of the robot determines a locality of the robot based on information received via the wireless communication component of the robot from a peripheral device, such as a beacon, located in an area in which the robot is operating. The peripheral device is configured to transmit radio-frequency identification information. For example each locality within a robot environment may respectively include a beacon configured to wirelessly emit respective location information (e.g. in an environment corresponding to a house, each "locality" may represent a room, and each room may be installed with a beacon broadcasting a unique identification over radio-frequency or other such medium). A base station may be provided in at least one locality, and the beacon may be configured to communicate with the base station and to relay data therefrom and/or thereto. It is advantageous for such beacons and base stations to save electrical power. The beacon may emerge from a low-power "hibernation" intermittently by listening for RF or IR of the robot, by operating a wake-up timer, by being actively RF or IR interrogated by the robot, or any permutation of combinations thereof based on time elapsed since a last event or number or frequency or character of interactions. Furthermore, the robot may activate a peripheral device according to a schedule or transmit schedule information to the peripheral device, which activates itself based on the schedule.

In another aspect, a robot system includes a network data bridge and a mobile robot. The network data bridge includes a broadband network interface, a wireless command interface, and a data bridge component. The broadband network interface is connectible to an internet protocol network and carries communications transferred in compliance with art internet protocol. The wireless command interface is connectible to a wireless command protocol network and carries communications transferred under a command protocol. The data bridge component extracts serial commands received via the broadband network interface from the internet protocol and applies the command protocol thereto. The data bridge component listens to the narrowband wireless interface and sends a robot, peripheral, network and system state to the Internet via the broadband network interface. This information is automatically sent to a monitoring service via internet protocols, where long-term monitoring and analysis takes place. Actions/commands resulting from this analysis are injected into the broadband wireless network by the RF-bridge. These actions can include serial commands, new software images for robot and/or peripheral, or queries for more in-depth (debugging) information that can be interpreted and responded to by the robot. The data bridge component also broadcasts the serial commands via the narrowband wireless interface. The mobile robot includes a drive system that moves the robot about an environment and a wireless command communication component that receives the serial commands transmitted from the network data bridge.

In some implementations, the system also includes at least one peripheral device to be placed in the environment. The peripheral device includes a wireless command communication component that receives serial commands transmitted from the robot and the network data bridge. The peripheral device also includes a controller having an active mode wherein the peripheral device is fully operative and a hibernation mode wherein the peripheral device is at least partly inactive. The wireless communication circuit is capable of activation in the hibernation mode.

In another aspect the robot can receive and utilize customizable sounds or other audio content for interacting with a user. The robot receives audible content and plays back the audible content in coordination with specific robot functions. In one example, the robot controls externally visible indicia of the robot in coordination with a play back of audible content such as, inter alia, synthesized voice content during a user interaction and/or training mode.

In yet another aspect, the robot includes a facade or external housing changeable with customized cladding. In one example, the home robot includes interchangeable molded plastic or metal body panels affixed to an exterior of the robot by snap-on fasteners, insertable fitting tabs and receivers, screws, magnetic fixing pieces, etc. The interchangeable body panels correlate to audio content uploadable to the robot. In one instance, the customized body panel includes an identification system for automatically causing the robot to download and/or use the corresponding audible content. The identification system may include an integrated circuit, characteristic resistance, bar code, optical identifier, RFID, passive magnetic resonance, or mechanical identification system (e.g. a punch-card-like series of holes or protrusions).

The ability to customize the robot by transferring selected sound or multimedia schemes, themes, tones, music, audio or visual content, choreographic or movement routines, or other data to the robot improves overall enjoyment from the robot by a user. In one aspect the robot includes a radio receiver configured to receive audible content via wireless transmission, a memory configured to store the audible content, a speaker configured to emit the audible content, and indicia controllable by a controller and configured to indicate operative information in a first mode and to indicate illustrative information in coordination with the audible content in a second mode. The indicia may include a light-emitting diode and also a power indicator configured to indicate an actual power state of the robot in the first mode and a training pattern in the second mode. The robot may further include a voice synthesizer configured to synthesize spoken didactic information based on the audible content. Also, the wireless transmission may be structured according to a packet-encoded transmission protocol. The robot may further include a customizable body panel detachably affixed to a main body of home robot, where the customizable body panel corresponds with themed audio data included in the audible contest.

The robot may be configured to operate in at least first and second modes. The first mode corresponds to a normal robot operating state of the performing a primary function. The second mode corresponds to a training mode, where the speaker emits an audible training instructional program. In the second mode, the indicia of the robot displays according to a training pattern in timed coordination with the audible training/instructional program, where the training pattern displayed on the indicia is different from an operative pattern corresponding to an actual state of the home robot.

In another aspect, a robot system includes a mobile robot and a wireless communication system for communicating with the robot. The wireless communication system includes a network interface unit configured to communicably interface with a first network and to wirelessly transmit data to the robot. The wireless communication system also includes a server configured to communicate with the network interface unit via the first network. The robot is configured to wirelessly transmit data to the network interface unit, which is configured to convert the data from a wireless protocol to a network protocol used by the first network. The network interface unit transmits the data to the server. The server may be configured to produce robot usage, robot behavior, and/or customer information based on the data transmitted to the server. Also, a user terminal configured to communicably interface with the first network and to control at least one function of the robot may be provided. The user terminal transmits a command corresponding to at least one robot function to the network interface unit via the first network. The network interface unit wirelessly transmits the command to the robot. User interaction is performed through this user interface, allowing further usage data to be collected. This offloaded interface also allows the robots to coordinate actions without needing to communicate directly with one another. The robot systems are functionally independent of one another, but are tied together via the server through a single user interface/data logging/usage information collecting server.

In one example, the wireless communication system includes audible content stored at the server. The server is configured to transmit the audible content to the network interface unit, which is configured to wirelessly transmit the audible content to the robot. Alternatively, audible content may be stored at the user terminal, which is configured to transmit the audible content to the network interface unit via the first network. The network interface unit is configured to wireless transmit the audible content to the robot. Furthermore, content may be stored at a base station to which the robot docks for recharging and/or servicing.

Robot-generated data may include theme data corresponding to audible content, in which the server transmits the audible content to the robot via the network interface unit in response to the theme data. The data may alternatively include a behavior theme configured to cause the robot to behave according to a theme. The audible content may include voice data. Other robot behavioral changes may be implemented based on long-term monitoring and analysis of the robot-generated data. (For example, if the robot does not make it back to the dock before the battery gives out three times in a row, the server modifies the behavior of the robot to start looking for the dock/base station earlier. This modifies the robot behavior to be "more conservative.")

Behaviors are parameterized and can be modified, or even disabled/activated based on analysis of usage/sensor information. Robot performance can be autonomously modified by the learned effects of the actual customer home. This can take place after the robot has been purchased and server is updated to provide a better model of robot/home performance characteristics. The wireless reporting infrastructure allows a modification of behavior based telemetry to provide the best performance for a particular customer. The learning process is dynamic and can change as an understanding of the data increases.

In one implementation, the wireless communication system includes a second user terminal winch is configured to communicably interface with the fast network. A theme may be stored at the first user terminal, which transmits the theme to the second user terminal via the first network. The first network may include UDP, TCP/IP, and/or Ethernet, as examples.

In another aspect, a content distribution system for distributing data to a robot includes a first server configured to communicably interface with a first network and a user-side node configured to transmit data to the robot. The robot receives customizable content via the user-side node. In one example, the content distribution system further includes a network hub configured to use a protocol compatible with the first network and a network adapter configured to communicably connect the network hub with the first network. The user-side node is configured to detachably interface with the network hub. In another example, a data slot is installed on the robot, and configured to receive the user-side node. In yet another example, the content distribution system further includes a content server configured to communicably interface with the first network and to transmit the audible content to the robot via the user-side node using the first network. The content server transmits content to the user-side node based on information received from the first server (e.g., the content served by the content server may include licensed content such as music or sound, images, "dance" moves or patterns performable by an appropriate type of mobile robot such as a wheeled robot—also referred to herein as "robo-motions", and the like, for which the copyright is held by a third party; alternatively, the copyright holder of the content may be the manufacturer or any other entity). Also, the user-side node of the content distribution system may be configured to receive content from the server via the first network, and the user-side node may be configured to transmit the content to the robot via a wireless communication protocol.

In some instances, the content distribution system further includes a user terminal configured to communicate via the first network and a content selection display presented on the user terminal. The customizable content is transmitted to the robot when selected from the content selection display on the user terminal. The user-side node includes an Ethernet dongle or a USB dongle (or "network bridge") configured to detachably connect to an Ethernet hub. The user-side node is configured to receive content via the Ethernet hub and is configured to transmit the content to the robot via a second protocol different from the first network. (As used herein, the term "data bridge" is understood to refer to all such dongles and/or pocketable and/or portable devices capable of appropriately communicating with a robot, either via wireless, wired, or direct physical connection, or any other suitable modality for such a portable device to communicate and/or transmit data to the robot.) Also, the user-side node may receive content from the data bridge or from a remote site, with no client application located on the user terminal just a web browser. Alternatively, a specific client application may be provided. The user-side node may be configured to operate using power supplied via the first network. The customizable content may include audible content, which may be organized in to a theme of related discrete sounds.

In other instances, the robot transmits information corresponding to a theme to the server via the user-side node and receives customizable content including thematically related audio data corresponding to the theme. In one implementation, a main body of the robot in chides a detachable body panel having an audio/theme identification unit. The robot is configured to identify audio content and/or a theme corresponding to the detachable body panel via the theme identification unit. The second protocol may include a wireless transmission protocol (e.g. ZigBee, 802.11a/b, wireless USB, serial-over-RF, AMPS, CDMA, GSM, Bluetooth, a simplistic or proprietary scheme, etc.).

The content distribution system may further include a voice synthesizer installed to the robot, in which the audio data includes voice synthesis parameters (for altering the perceived "personality" of a robot, or to better accommodate someone who has hearing loss in certain frequency ranges, for example).

Also, the robot may further comprise a robot firmware which is customized based on user feedback or robot sensor data processed by a server, in which the robot firmware is downloaded to the robot from the server.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
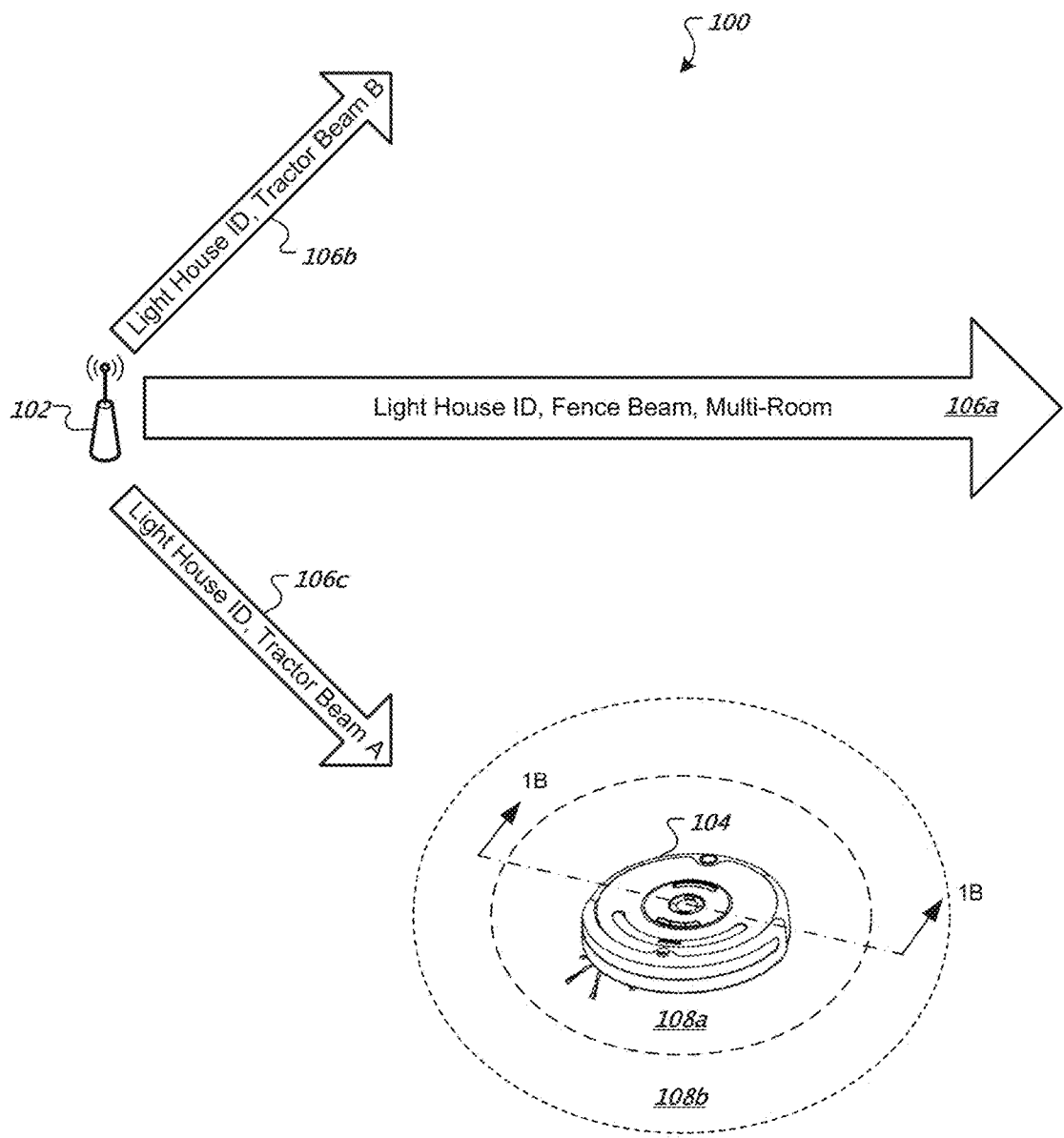
FIG. 1A is schematic diagram showing an example of a power-saving robot system.

FIG. 1A is schematic diagram showing an example of a power-saving robot system 100. The system 100 includes a peripheral device 102 and a mobile robot 104. In this example, the mobile robot 104 is a cleaning robot, such as a vacuum, brushing, or mopping robot. The peripheral device 102 transmits wireless commands to control the movement of the mobile robot 104. When the mobile robot 104 is out of range of the peripheral device 102, the peripheral device 102 enters a hibernation mode or low power consumption state. When the mobile robot 104 is in range of the peripheral device 104, a wireless command transmitted by the mobile robot 104 activates the peripheral device 102 from the hibernation mode. In certain implementations, the mobile robot 104 and the peripheral device 102 use a point to point protocol while communicating to one another. In certain implementations, the peripheral device 102 is a base station, such as a device to recharge the mobile robot 104 or a receptacle to empty debris from the mobile robot 104.

Figure 1B:
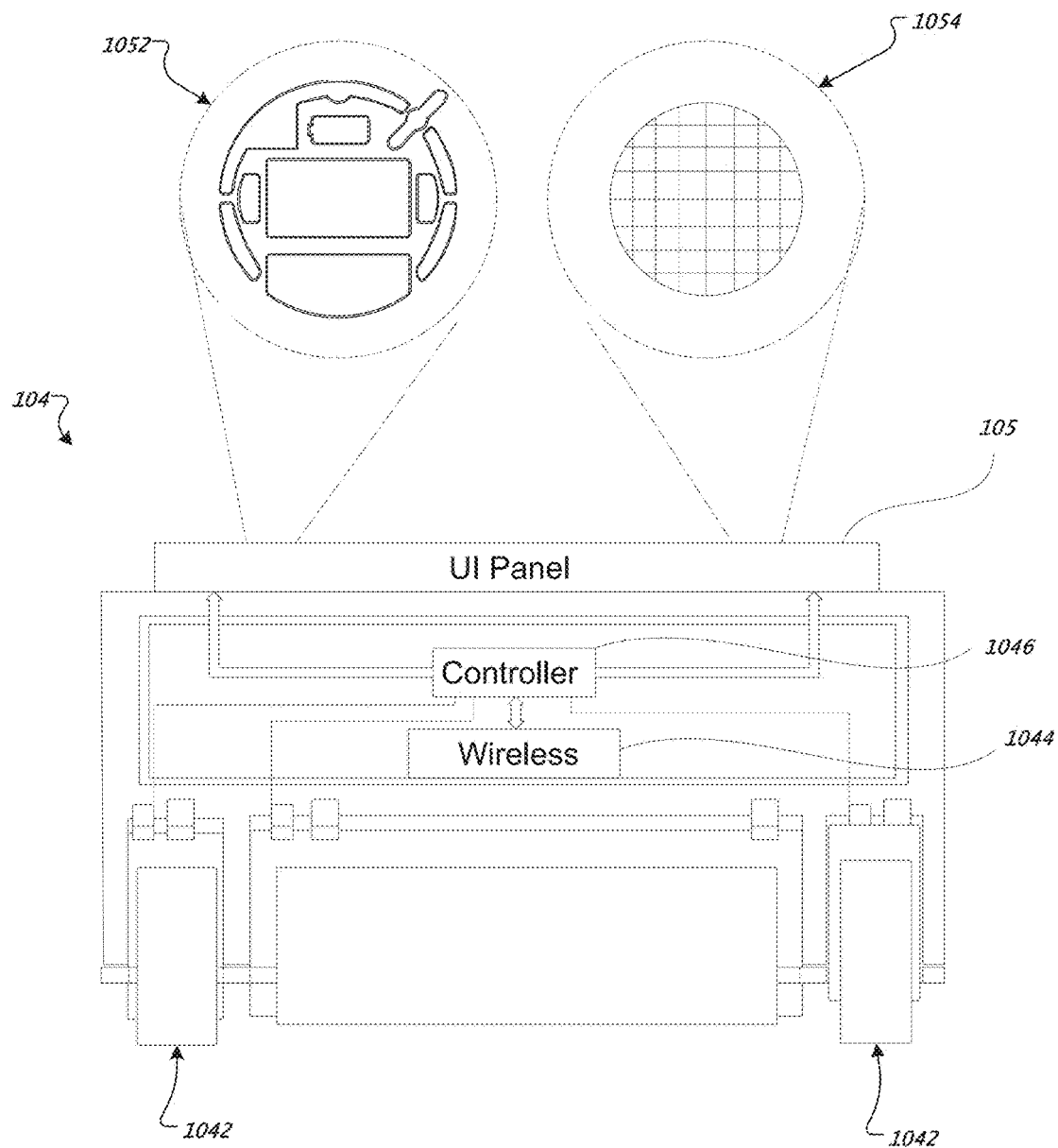
FIG. 1B is a sectional view showing an example of a mobile robot.

Referring to FIG. 1B, the mobile robot 104 includes a drive system 1042, a wireless communication component 1044, and a controller 1040. The drive system 1042 moves the mobile robot 104 about an environment, such as a floor to be cleaned. The wireless communication component 1044 communicates with the peripheral device 102. For example, the wireless communication component 1044 may receive signal beams from the peripheral device 102, such as infrared (IR), radio frequency (RF), and/or audio signals. In certain implementations, RF signals may be used to provide communication when the peripheral device 102 and the mobile robot 104 are outside of one another's line of sight. In certain implementations, IR signals may be used to provide communication when the peripheral device 102 and the mobile robot 104 are inside of one another's line of sight. In addition, the mobile robot 104 may use the signal strength to determine a distance to the peripheral device 102. The signals may prohibit movement of the mobile robot 104 through a particular area or guide the movement of the mobile robot 104 to a particular area. In addition, the controller 1046 uses the wireless communication component 1044 to temporarily activate the peripheral device 102 from a hibernation state, such as a state consuming a low amount of power. In certain implementations, the mobile robot 104 uses an IR signal, or line of sight form of communication, to activate the peripheral device 102 from the hibernation mode. In certain implementations, the mobile robot 104 sends the activation command in response to a query from the peripheral device 102. In certain implementations, the mobile robot 104 occasionally sends the activation command, such as continuously or periodically.

Figure 1C:
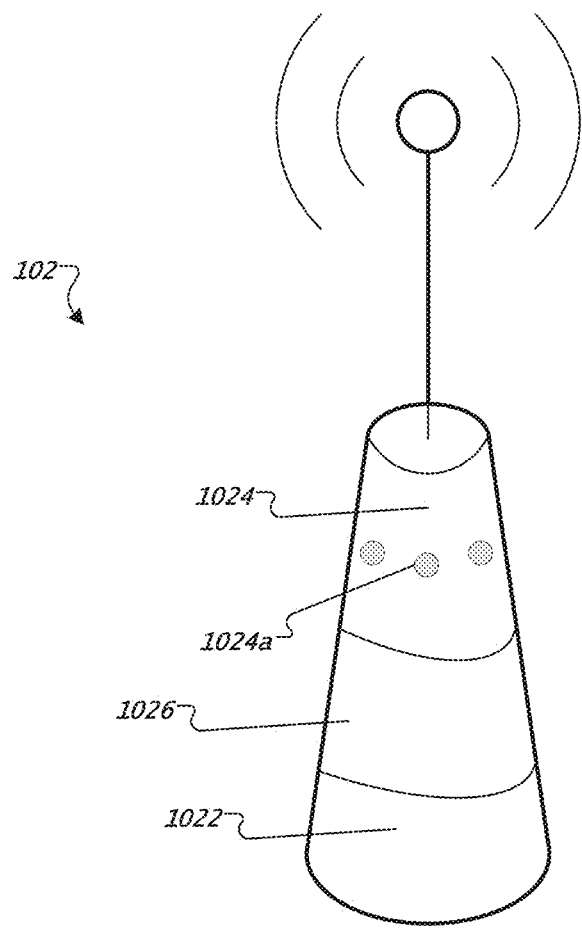
FIG. 1C is schematic diagram showing an example of a peripheral device.
Figure 2:
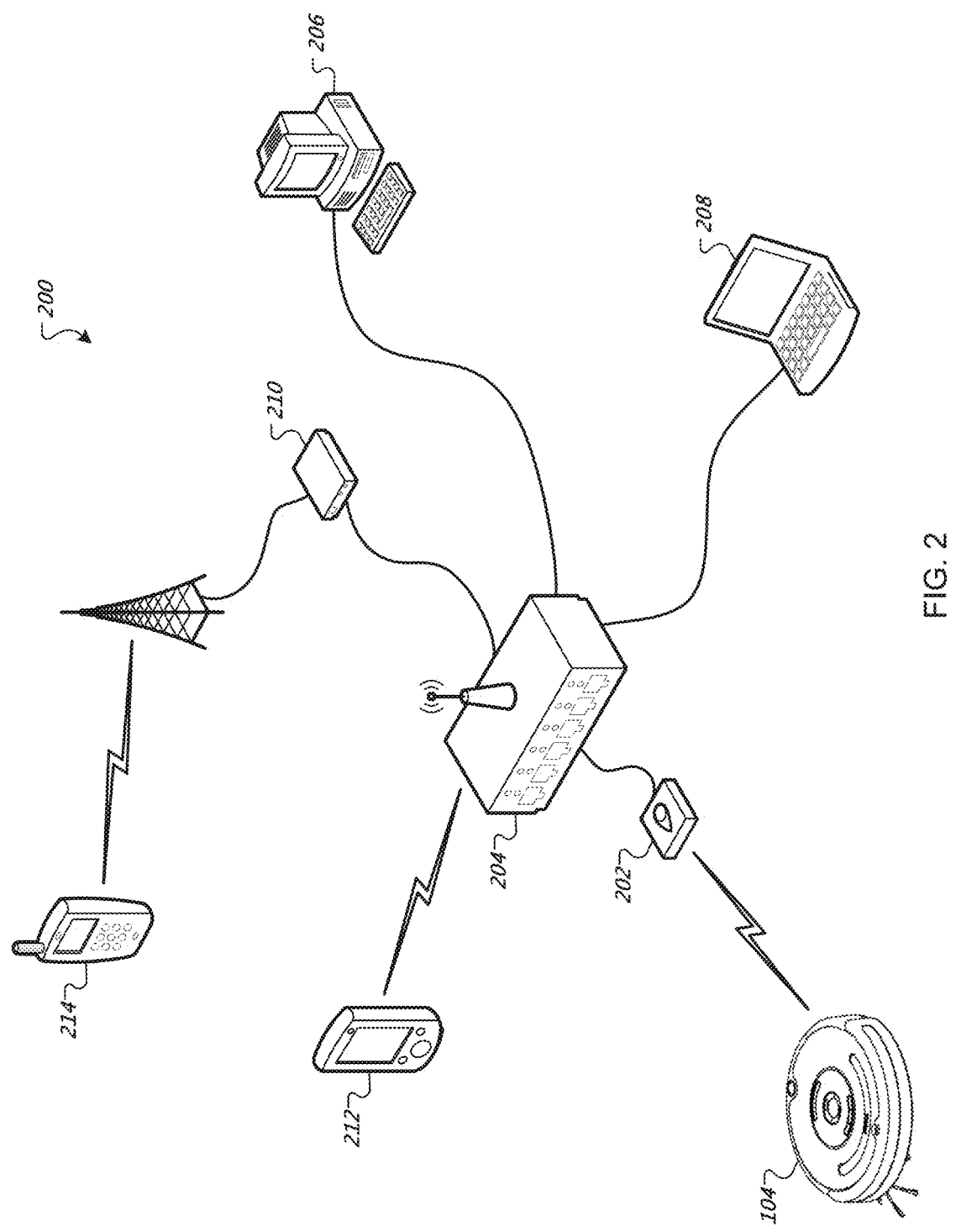
FIG. 2 is a schematic diagram showing an example of a robot system.

Referring to FIG. 1C, the peripheral device 102 includes a power supply 1022, a wireless communication component 1024, and a controller 1026. The power supply 1022 may be, for example, an electric battery. The power supply 1022 provides power to the various functions of the peripheral device 102, such as generating navigational signal beams 106a-c. The wireless communication component 1024 generates a fence beam 106a, a left guide (or directed) beam 106a, and a right guide (or directed) beam 106c. The wireless communication component 1024 also receives wireless signals from the mobile robot 104. The controller 1026 activates one or more of the beams 106a-c during the active mode and disables beams 106a-c in the hibernation mode. In certain implementations, the peripheral device 102 occasionally listens for an activation command from the mobile robot 104. In certain implementations, the peripheral device 102 sends an activation poll to the mobile robot 104 to determine if it should become active. In this example, the fence or barrier beam 106a prevents the mobile robot 104 from passing through the area where the mobile robot 104 detects the fence beam 106a. Beams 106b-c aid the navigation of the mobile robot 104.

In certain implementations, the robot 104 includes a display panel 105 in electrical communication with the controller board 1046. The display panel 105 includes indicia 1052 and an audio output device 1054. In one example, the indicia 1052 include a segmented illuminable maintenance display substantially mimicking the appearance of the robot. In other examples, the indicia 1052 include themed displays, which will be described later in further detail. The controller board 1046 controls the illumination of indicia 1052 and the audio responses from the audio output device 1054.

The peripheral device 104 may perform in several capacities. For example, the peripheral device 102 may act as a fence. The peripheral device 102 may use the fence beam 106a to prevent the mobile robot 104 form passing through an area, such as a doorway. The peripheral device 102 may also act as a gate. The fence beam 106a may provide a gate that prevents passage during a particular time interval, such as when the mobile robot 104 is in the process of cleaning a room. The peripheral device 102 may deactivates the fence beans 106a when the mobile robot 104 has finished cleaning the room and grants passage to the mobile robot 104. The mobile robot 104 uses the beams 106b-c to guide its way through the area covered by the gate. In addition, the peripheral device 102 may act as a trail marker or navigation beacon. For example, as described above the mobile robot 104 may use the beams 106b-c to navigate through areas, such as doorways. The beams 106a-c may contain information, such as an identifier (ID) of the peripheral device 102, an identifier of the type of beam, and an indication of whether the peripheral device 102 is a gate or a fence. If it is a gate, the beam identification allows the robot 104 to determine whether it is detecting the left or right guide beams 106b and 106c, respectively. The peripheral device identifier allows the mobile robot 104 to distinguish the beams 106a-c of the peripheral device 102 from beams transmitted by another peripheral device. The mobile robot 104 may be taught (or may itself learn) a path to an area, such as a back room of a house, by following a pattern of peripheral device identifiers. The beam type identifier indicates whether the beam is a fence beam 106a, a left side navigation beam 106b, or a right side navigation beam 106c. If the beam is a fence beam 106a, the beam information may also indicate whether the beam is acting as a gate that may be opened, given the proper command, or a barrier that remains closed. In any case, while the mobile robot 104 is out of range, the peripheral device 102 hibernates and the beams 106a-c remain inactive.

The wireless communication component 1024 of the peripheral device 102 receives a signal from the wireless communication component 1044 of the mobile robot 104 to activate the peripheral device 102 from a hibernation state. In certain implementations, the mobile robot 104 transmits a first activation signal 108*a* to activate a first set of peripheral device beams, such as the fence beam 106*a* while cleaning is in progress. In certain implementations, the mobile robot 104 transmits a second activation signal 108*b* to activate a second set of peripheral device beams, such as the navigation beams 106*b-c* when the mobile robot 104 moves to another room. In certain implementations, the signals 108*a-b* include a mobile robot identifier. The peripheral device 102 may use the mobile robot identifier to activate, for example, a first set of beams, such as the fence beam 106*a*, in response to an activation request from the mobile robot 104 and a second set of beams, such as the beams 106*b-c* in response to an activation request from a second mobile robot. In this example, the mobile robot identifiers allow the peripheral device 102 to activate beams based on the mobile robot requesting the activation, such as by providing a fence to the mobile robot 104 and a gate to a second mobile robot.

FIG. 1 is a schematic diagram showing an example of a robot system 200. The robot system 200 includes the mobile robot 104 and a network data bridge 202. In this example, the wireless communication component 1044 of the mobile robot 104 receives serial commands from the network data bridge 202, such as radio-frequency (RF) signals. Typically, these signals may be transmitted by the network data bridge 202 or other such user-side node, which is in turn connected to an Ethernet router/switch/hub 204 along with several other Ethernet-connected devices such as a home computer 206, a laptop computer 208, a cable/DSL/satellite/broadband-adapter 210 or modem, and e.g. one or more other computing devices such as a personal digital assistant 212.

In one example, the network data bridge 202 which attaches to an Ethernet port on the Internet-connected router 204 or switch may automatically download a script from a predetermined Internet or local server (e.g., via BOOTP, DHCP, HTTP, FTP, and/or TFTP) thereby providing automatic commands, such as device configuration or diagnostic testing, to be performed. Alternatively or additionally, a user may manage the mobile robot 104 using a device, such as the computer 206. The Ethernet-attached network data bridge 202 may provide for configuration and operational functionality via a small, embedded HTTP server built into the firmware of the network data bridge 202. Devices other than the computer 206 may also be used to interface with the network data bridge 202, such as a set-top box, a game console, the PDA 212, a cell phone 214, or a home server that is programmed to communicate using web or other networked interfaces.

As an alternative, access to broadband is provided via a USB port, as may be provided by the computer 206. For example, a user may insert a driver CD-ROM into the computer 206 upon plugging in a USB-based wireless transceiver, in order to install a driver therefore. Another connection, such as IEEE 1394/Firewire, RS-232, parallel port connections, and/or X10, may be used. These, however, may not necessarily be network data bridges.

Once a network data bridge 202 is attached to the network-accessible device 204, it can contact a server.

Figure 7:
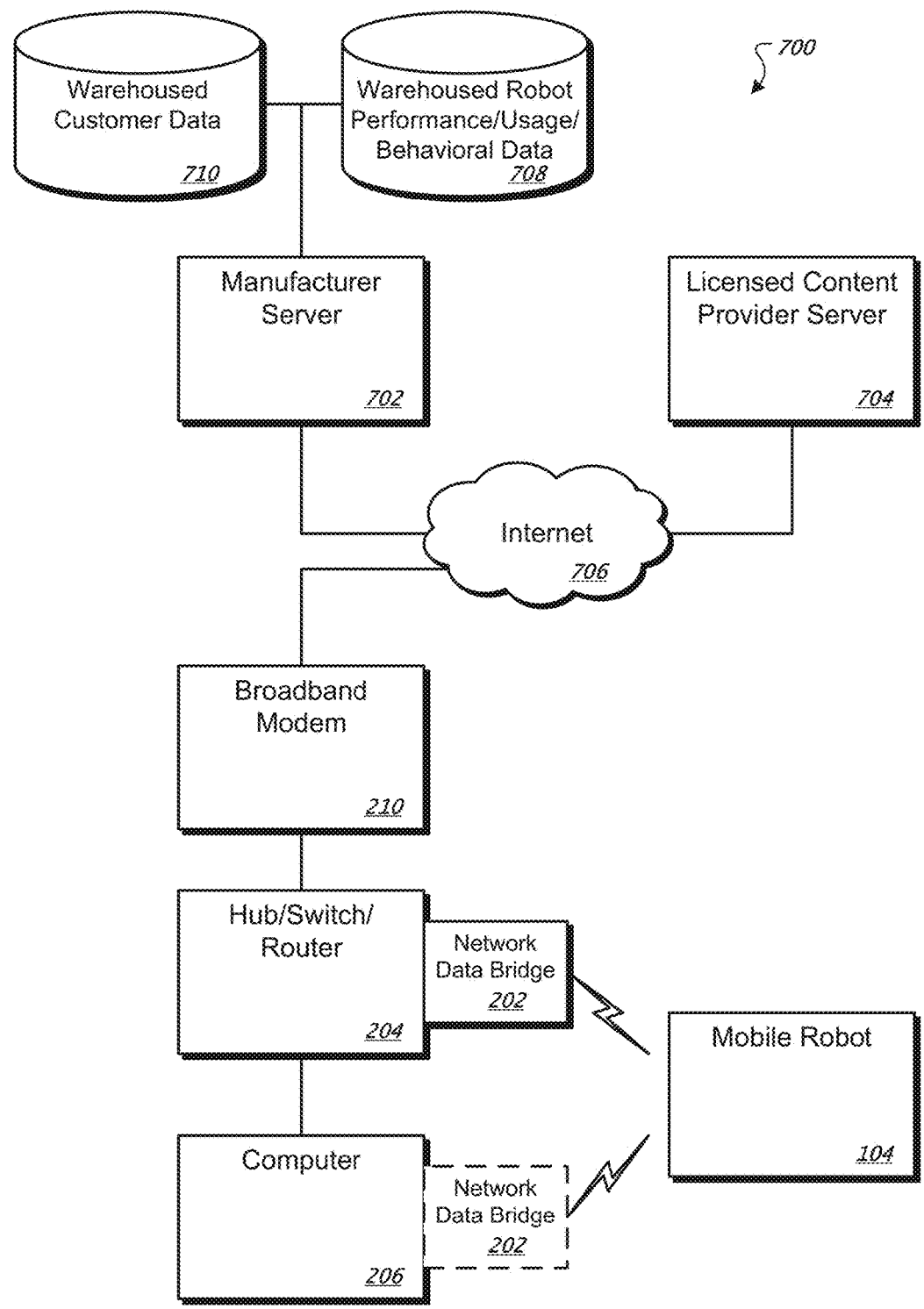
FIG. 7 is a block diagram showing an example of a robot system including a manufacturer server and a licensed content provider server.

FIG. 7 is a block diagram showing an example of a robot system 700 including a manufacturer server 702 and a licensed content provider server 704. The manufacturer server 702 and the content provider server 704 may be connected to the broadband modem 210 via the Internet 706 or another appropriate network. The mobile robot 104 may report information to the server 702, such as the status of the mobile robot 104 or usage data regarding the mobile robot 104. The server 702 may store the reported data in a repository 708. The reported data may be associated with information regarding the user of the mobile robot 104. The user information may be stored in a repository 710.

Further, the network data bridge 202 may connect wirelessly to the mobile robot 104 and initiate communications therewith. While the Ethernet hub 204 includes four wired Ethernet ports as well as 802.11 wireless Ethernet connectivity, and although 802.11 or other such wireless networking protocol may be used to communicate with a mobile robot 104 from the base station other than via a network data bridge, in certain implementations, the mobile robot 104 and the network data bridge 202 use a simple, serialized RF protocol in order to exchange information between the mobile robot 104 and the base station, rather than the full-weight networking protocols.

In certain implementations, the mobile robot 104 may be further simplified by providing receive-only functionality on the mobile robot 104, instead of bi-directional wireless communication support. However, as an alternative, the mobile robot 104 may include full bi-directional wireless communications support in order to transmit information from the mobile robot 104 to the base station (and e.g., to the user, the manufacturer, etc.).

The manufacturer may receive real-world mobile robot data for product refinement and R & D. For example, the mobile robot 104 may collect data regarding behavioral patterns (e.g., a number of errors encountered, a number of times the mobile robot 104 has become stuck, or how frequently the mobile robot 104 is used) and forward such information to the mobile robot's manufacturer for refining market research and producing future models of the mobile robot 104, for example, by correcting design flaws or device problems. Moreover, customer information such as frequency of robot use, name, customer ID, etc., may also be correlated using information forwarded to the manufacturer's website from the mobile robot 104 via wireless and wired networking.

In addition, instead of the user having to locate and e.g., tote the mobile robot 104 to the base station in order to physically connect the mobile robot 104 thereto for software upgrades, software updates, and the like, a wireless update function may be provided by the network data bridge 202 in order to update the robot's firmware or other onboard software, personality, sounds, and/or displayed pictures. Also, a user may design themes or other content and have this content transmitted to the mobile robot 104 via the wireless communication channel provided by the network data bridge 202.

Figure 3:
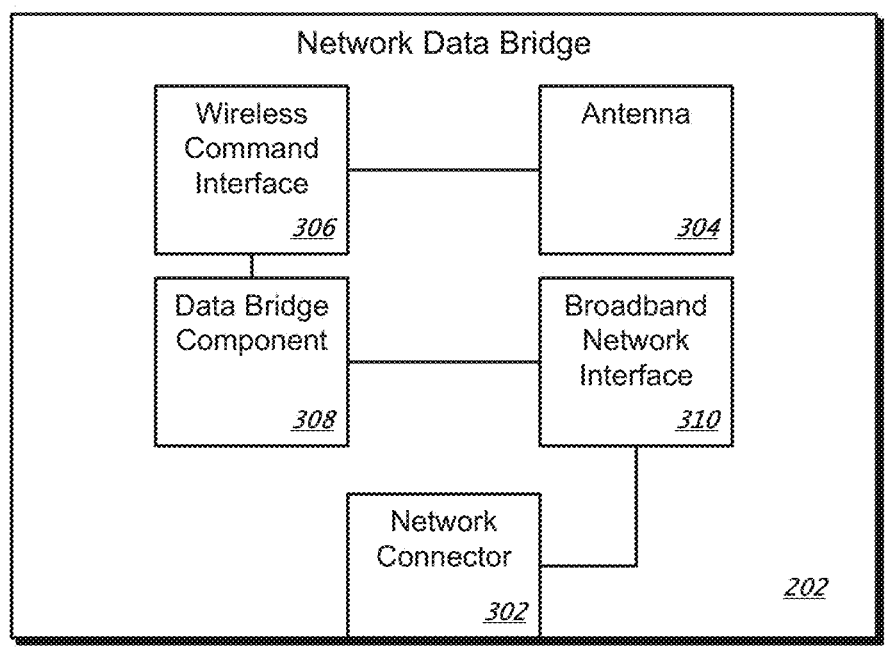
FIG. 3 is a block diagram showing an example of a network data bridge.

FIG. 3 is a block diagram showing an example of a network data bridge. The network data bridge 202 includes a network connector 302, such as an RJ-11-style male Ethernet connector. Also, the network data bridge 202 includes an antenna 304, such as an enclosed, internal antenna, operatively driven by a wireless command interface 306, which is in turn connected to a data bridge component 308 (the mobile 104 robot may likewise include an enclosed, internal antenna; alternatively, either the network data bridge 202 and or the mobile robot 104 may either one or both include one or more external antennas, either in addition to or in lieu of an internal antenna, for example). The date bridge component 308 is connected to a broadband network interface 310 for managing and converting inbound and outbound broadband-side data (such as Ethernet, 802.11b, and/or TCP/IP packets) to and from to a wireless-side simplified networking protocol. The data bridge component 308 extracts serial commands received by the broadband network interface 310 and broadcasts the commands via the wireless command interface 306 and the antenna 304, using the RPAN protocol.

The network data bridge 202 is plugged directly into the owners broadband router 204. The network data bridge 202 acquires network information from a DHCP server or optionally configured by an advanced user. The network data bridge 202 calls home (i.e., a home robot manufacturer's or reseller's Internet server) with local configuration information (serial number, local network properties, etc.). The network data bridge 202 begins polling a pre-configured URL with periodic HTTP POSTs. Each post contains status information on the mobile robot(s) 104 in the customer's home. This data can be robot/firmware specific—the network data bridge 202 need not understand the data itself (although it may well do so in certain implementations).

A CGI script receiving the POSTS processes this sensor report and updates an internal database creating a historical view of the robot system. Software-based virtual sensors examine this database (on a per-robot basis) and trigger events such as virtually pressing a button on the robot or triggering an email to its owner.

The owner may visit the home robot manufacturer's web presence using a modern, i.e.; JavaScript-enabled (or any other suitable scripting language such as Visual Basic, python, PERL, Php, etc.) web browser, and creates a user account. As part of the registration process, the customer enters the unique key as shipped with the wireless data bridge—this unique key pairs the incoming sensor stream with this user's account.

After registration, the user may be forwarded to their portal page. This page is dynamically generated using the information already provided by the robot gateway and product information and tie-ins provided by the back end infrastructure of the manufacturer's server(s).

Owner browses to theme or content store and purchases an audio theme with immediate online delivery. Theme or content store contacts robot sensor database and adds to the command queue: "download this content to robot #2" When the gateway device next posts sensor data, the HTTP response is the command to download the attached content data to the specified robot. The wireless data bridge begins forwarding this binary stream to the robot via RF. When completed, the gateway may sends a download acknowledgement with the next sensor report.

During this transaction, the javascript (or other suitable script) embedded into the owners' web interface has been polling the back-end servers for status updates. A progress bar has been drawn and animated using javascript and DHTML (or Ruby on Rails, a JAVA applet, or any other suitable display technology). The user may feel that s/he is interacting directly with the robot via the web page, despite the levels of software and communication indirection laying therebetween.

In one implementation, the wireless data bridge 202 may include a female port into which an Ethernet patch cable (or other such networking cord) plugs into from a suitable network connection point, and/or into which an interface portion of a home robot attaches, for example. As examples of such a system as described hereinabove, these communication channels provides a mechanism for retrieving sensor data and sending commands to robots in the field by piggy-backing on their broadband connection.

Such a bi-directional communication system allows deployment of online services and to retrieve sensor data from a manufacturer's installed base for improved customer service and system characterizations. It may further increase the manufacturer's comprehension of how robots and individual subsystems perform in the field.

Interaction the network-enabled mobile robot(s) 104 in a customer's home may take place through a web browser, in accordance with certain embodiments. Web browser access provides support for robot interaction via non-PC devices (e.g., cell phones, and PDAs) with compliant browsers.

Figure 6A:
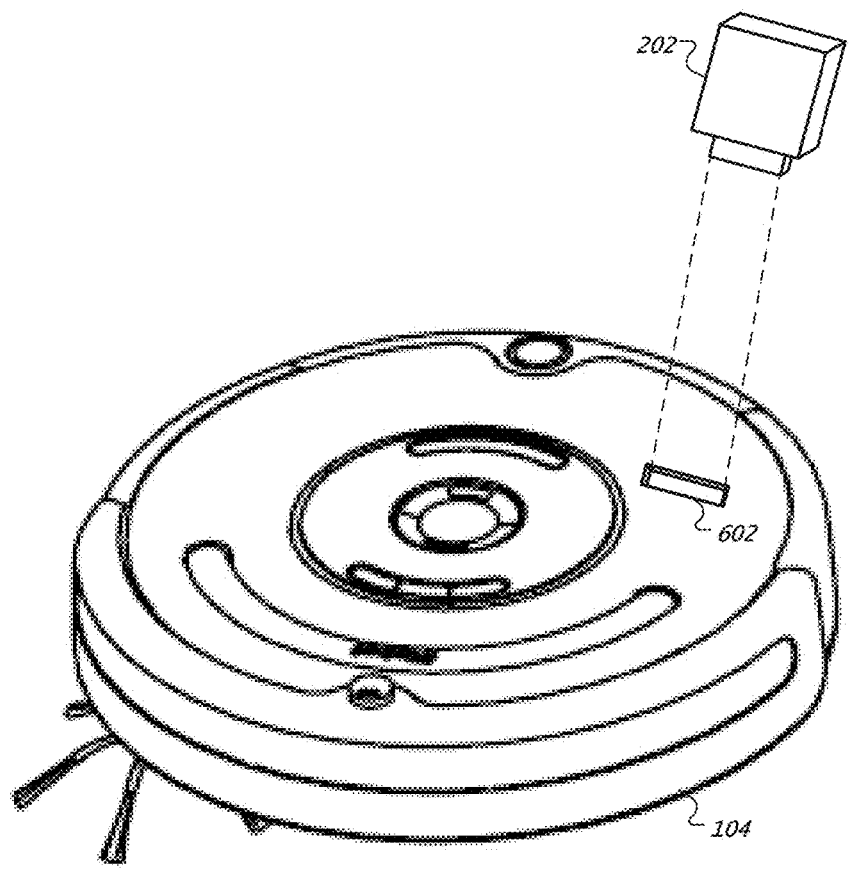
FIG. 6A is a schematic diagram showing an example of a mobile robot that includes a network data bridge.

FIG. 6A is a schematic diagram showing an example of the mobile robot 104 that includes the network data bridge 202. In this example, the network data bridge 202 is a card that is inserted into an interface slot 602 in the mobile robot 104. This type of network data bridge may be self-contained and transport data on constituent RAM, ROM, Flash, or EEPROM, type storage devices (which might be loaded with software, video, or audio content either at a user's computer equipped with a special writing unit or at the manufacturer in order to provide content such as themed content, for example); or can be loaded with code numbers) that authorizes a wireless download to the network data bridge 202; or, alternatively, may be connected to a network via a wire or by wireless Ethernet, for example.

A "Memory stick"-type (serial port interface), network data bridge 202 may provide content to mobile robot users who lack an Ethernet hub or Internet connection, or for users who are unable to purchase content online via credit card, or who simply come across a set of content while at a store and wish to make an impulse purchase or gift purchase for another. Furthermore, similar to the network data bridge implementation discussed above, personal computer use is not necessarily required because the user may plug the "memory stick"-type network data bridge 202 directly into a receptacle 602 defined by the mobile robot 104, and content on the network data bridge 202 may be automatically uploaded to the mobile robot 104. See, e.g., U.S. patent application Ser. No. 11/166,518, incorporated herein by reference in its entirety.

Figure 6B:
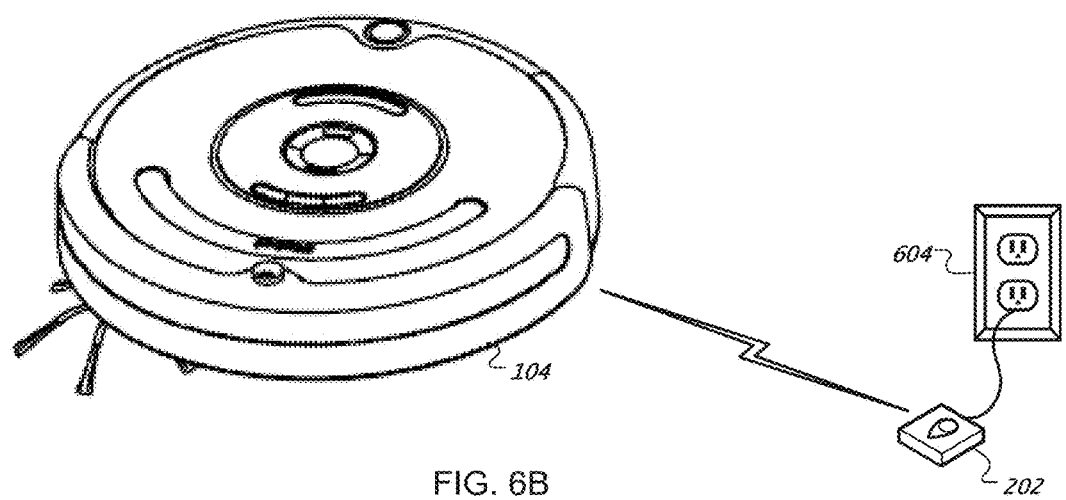
FIG. 6B is a schematic diagram showing an example of a mobile robot and an example of a network data bridge which connects to other networks via a network that runs over power lines in a building.

FIG. 6B is a schematic diagram showing an example of the mobile robot 104 and an example of the network data bridge 202 which connects to other networks via a network that runs over power lines in a building. The network data bridge 202 may be configured to plug into a standard power outlet 604 and to participate with a home power-line network, for example, in homes or markets where Ethernet networking components are not available. Alternatively, the network data bridge 202 may plug into a standard telephone wall jack in order to communicate via a home telephone wiring network, for example. In certain implementations, the network data bridge 202 might be plugged into any of an Ethernet port, the power socket 604 or a telephone wall jack, and auto-negotiate a connection to the Internet (if available) and/or to the mobile robot(s) 104. To this end, many "Ethernet-over-home power lines" and similar schemes or products are widely produced and well known in the art; for example, as an early commercial endeavor in this technology area, the X10 communication standard permits communication over power lines by encoding: a single bit of information at each zero-point in the 120 V(RMS) @ 60 Hz power cycle common in North America, for example, and many more modern Ethernet-like power line networking systems are commercially available, in which each networked device connects to the network typically via an electrical socket on a wall. A common feature is that the network data bridge extracts the serial commands and data from encapsulating broadband protocols (Ethernet, TCP/IP, 802.11x) for transmission on the local wireless robot network (RPAN), and similarly encapsulates such commands and data from the RPAN for transmission on the broadband network.

The wireless data bridge 202 may provide web server functionality and serve static or dynamic web content corresponding to enabled mobile robots 104 belonging to the mobile robot user. Such web server functionality may be provided on the mobile robot user's local broadband network and e.g., be broadcast discoverable using TCP/IP, UDP, Ethernet, SNMP, NetBEUI, IPX, SMB or uPnP broadcast network announcing, for example, in order to be found by mobile robot users when browsing the local area network; alternatively, a static network address (such as a standard, pre-set IP address) may be assigned to the data bridge 202 such that users may simply type the static network address into a web browser to reach the web server on the network data bridge 202. The web content may be active or static, and may be tailored to the functionality to be provided and/or may be updated via the Internet or local network.

FIG. 9 is a schematic diagram showing an example of the robot system 200 with a content serving system for transmitting content to a mobile robot. The system 200 for accessing home robot-related content and controlling a home robot via the Internet may include an embedded web-server, an online presence accessible as a service content provider; and a web-based user interface specific to the robots 104 in the customer's home. These components may be used to tunnel events across the Internet to an online "robot presence" generated by, for example, a home robot manufacturer. This "robot presence" may provide interactivity with the user's home robot (audible content or other types of theme and/or content downloads, remote button presses, etc.) via a hosted web service. The events thus tunneled may include: changes in sensor values, user interaction, commands to the robot, and state changes, inter alia. Use of a bi-directional communication channel (such as a wireless robot network communication channel) allows melding between a robot in someone's home, procedural and informational repositories on a remote server, and a web-based robot user interface, to produce powerful capabilities and forge new functionalities such as adding offloaded "intelligence" to otherwise simple robots (by, for example, performing the bulk of number-crunching or compute-intensive tasks on a separate computer or server, and simply uploading and/or downloading results and/or sensor input to and from the home robot itself). In effect, by tunneling the local robot system's communication fabric across the Internet or other suitable network, it is possible to allow back-end servers to interact with robots in users' homes.

The data bridge 202 may send local network information to the Internet server. As a non-limiting example, the user may connect to the Internet 706 and may be redirected to the local bridge as appropriate. By publishing a well known Internet address that both bridge and/or the user may access, the need to know the user's local information may be eliminated.

In addition to the network data bridge 202, a wireless remote control may offer several similar wireless functions for controlling or managing the mobile robot 104. The wireless remote control may communicate directly with the mobile robot 104 via an infrared (IR) or RF protocol, or may relay commands through the network data bridge 202, for example, when the mobile robot 104 is not within sight but the remote control is within IR signaling range of the network data bridge 202. The network data bridge 202 may thus also be provided with an IR sensor for receiving mobile robot control commands from the wireless remote control, and then relay the commands wirelessly to the mobile robot 104—for example, the embedded web-server may bridge a proprietary or ad-hoc communication method used internally by the mobile robot 104 (and also used by accessory items added to the mobile robot 104) with a persistent online presence by translating the internal communication protocol(s) into HTTP POST and GET transactions.

The online presence may generate a web-based user interface that incorporates javascript components to asynchronously poll the mobile robot 104 for state changes (e.g., battery voltage). This javascript may asynchronously fetch changes in the robot properties and rewrite the content in the page. Sensor values, etc., can be refreshed by the web browser without the customer needing to click refresh on the browser, for example.

The web-based interface may use customer tracking and persistence robot sensor data to pair the mobile robot 104 with the customer account and present user interfaces for equipment the customer owns.

Further, if a series of the peripheral devices 102 are arranged throughout a home or other location and set up as a relay network stemming from the base station, for example, then the commands relayed from the remote control may also be relayed throughout the beacon network to reach a home robot that may be quite distant from the remote control.

Wireless bandwidth (especially in unlicensed bands such as 900 MHz, 2.5 GHz, or any other such suitable public RF band) is by its nature limited, and because the presence of multiple RF devices (such as, for example, multiple mobile robots and/or network data bridges; WiFi, BlueTooth, X10, mobile or portable telephone or other common wireless devices; and/or interference from sources such as solar flares, RF discharge from electrical lines, fluorescent lights, or any other RF-interfering entity) may further restrict the effective amount of bandwidth or the degree of reliability of bandwidth available for wireless mobile robot communications, reliability and postponement measures may be taken to enhance the functionality of the network data bridge 202 and/or the mobile robot 104; conversely, the network data bridge 202 and/or the mobile robot 104 may be configured to reduce their consumption of available bandwidth in order to give priority to other wireless devices. For example, regarding the reliability of the wireless robot network communications, techniques such as cyclic redundancy checking (CRC) and/or hash routines (such as MD5 sums or CRAM) or other appropriate reliability techniques (such as parity or error correcting codes (ECC)) may be employed on either the data bridge-to-robot channel and/or the Internet-connected channel (e.g., on the Ethernet-to-data bridge channel). Furthermore, to limit the use of valuable bandwidth during business or other peak usage times, the network data bridge 202 and/or the mobile robot 104 may be scheduled to transmit theme content, usage/behavior data, or any other such communication during night-time or off-peak tunes; alternatively, for example, the network data bridge 202 and/or the mobile robot 104 (and/or the manufacturer's server) may be scheduled to perform their communication (or the bulk of their communication) at an automatically detected off-peak usage time, by detecting when bandwidth usage is lowest (either in real-time or by collecting data of bandwidth usage-per-time-of-day over a series of days or weeks and then determining the generally least used times of day, as non-limiting examples). Reliability measures may be taken at either the network or application layer or both, for example, or at any other suitable layer in a communication stack (such as the data bridge using UDP on the Internet for simplicity and non-critical communications, but the web server using full error-checking, reliability and/or error correction measures, windowing, etc.

Also, the web server functionality in such a data bridge can communicate with a known network address or location (such as a fixed IP address or uniform resource locator (URL)) in view of issues that arise with DHCP and dynamic IP address assignment, for example; the web server on the network data bridge 202 may thus behave in a manner similar to a client for a significant portion of time in order to actively access and/or poll "server"-like resources available on the mobile robot 104 (via wireless connection, for example), as in many examples the mobile robot 104 maintains relatively little network functionality in the mobile robot 104 itself (such capabilities being offloaded largely onto the network data bridge 202).

The web server functionality may establish network communications with the mobile robot 104 and/or Internet server(s) via a suitable protocol or standard, such as FTP, FTPS, TFTP, HTTP, HTTPS, GOPHER, TELNET, DICT, FILE and LDAP, HTTP POST, HTTP PUT, FTP uploading, HTTP form based upload, proxies, cookies, user+password authentication (Basic, Digest, NTLM, Negotiate, Kerberos4), file transfer resume, http proxy tunneling, and/or other suitable network methods (such as a method supported by libcurl, for example). The network data bridge 202 may employ network announcement techniques such as uPnP, dynamic DNS, reverse ARP, Ethernet or UDP or TCP/IP broadcasting, or another suitable method of broadcasting the existence of the network data bridge 202 to other devices on the same network.

By offloading much of the server functionality from the mobile robot 104 to the network data bridge 202, and using the network data bridge 202 as a communications proxy, mirror and gateway, the mobile robot 104 is also shielded from excessive client requests that might otherwise tax its processing and/or bandwidth resources. For example, the mobile robot 104 may in one time period (e.g., ten minutes) produce thirty visual snapshots from an on-board camera. Then, if several entities were to attempt to download the snapshots from the mobile robot 104 simultaneously, the mobile robot 104 might quickly be overwhelmed as the wireless network became bogged with service request traffic. As an alternative, however, the mobile robot 104 may be accessed by just one entity, the network data bridge 202, at a known regimen of polling requests, thus preserving the mobile robot's bandwidth and processing capability while still permitting replication of any such collected data by copying it to Internet servers for broader access, for example.

In addition to RF-band wireless communication, the network data bridge 202 (and/or the mobile robot 104 or the peripheral device 102) may transmit via other suitable frequencies and/or bands in the electromagnetic spectrum, such as the 900 MHz, 2.4 GHz, microwave frequencies, or other suitable bands. To alleviate interference that may occur in these or the RF or another band, the mobile robot 104 and/or the network data bridge 202 may employ frequency shifting, spread spectrum, sub-channel technologies, and/or other such interference-avoidance schemes or techniques for avoiding interference with other unlicensed RF applications (phones, baby monitors, etc.).

In addition, robot commands might be sent by the network data bridge 202. Additional functionality may be provided to the user in the form of issuing remote commands while away from home. Accordingly, if a home robot owner were to forget to schedule or activate the mobile robot 104 prior to leaving on a business trip, the mobile robot user might still program or activate the mobile robot 104 remotely via a command generated by (for example) a mobile robot interaction website provided by the mobile robot manufacturer, which would be relayed through the Internet or other suitable network to the network data bridge 202, which would in turn convert the information received from the Internet into a corresponding wireless robot network command and transmit the command wirelessly to the mobile robot 104 for execution.

In certain implementations, a series of robot commands corresponding to timing and execution of movements, etc., may be compiled into a "dance" routine and transmitted to the mobile robot 104 after a user selects the "dance" from a website maintained on the mobile robot manufacturer's server, alternatively, the "dance" might be combined with audible content such as music or sounds, and or commands to control the indicia (such as light-emitting diodes (LEDs), liquid-crystal displays, and/or backlights, inter alia) to provide a multimedia "dance," music and lightshow. A further non-limiting example includes live trouble-shooting or technical support provided to mobile robot users, e.g., initiated through a telephone call or the Internet, or e.g., through a microphone and speaker installed as part of the mobile robot 104 along with the appropriate computing, recording, mixing and transceiving hardware and software (and bandwidth, both wireless and over the Internet, as well as proper latency and synchronization). Additionally, for example, a camera might be included for enhancing such virtual interaction, and/or the proximity sensor normally put to use in obstacle detection may be employed during alternative modes as a general-purpose observation camera in those implementations in which the proximity sensor is configured to function as a visual-spectrum camera, with encoding and transmission of streaming video from the robot via the wireless link to the network data bridge 202 and onto a networked destination, inter alia.

Similarly, for transmitting robot usage and behavior information to the mobile robot manufacturer's server, the mobile robot 104 may collect certain data regarding battery use, recharging frequency, amount of time spent performing its primary task, the amount of time spent idle, the frequency with which the robot becomes stuck, etc., and periodically transmit this data to the mobile robot manufacturer's servers via the network data bridge 202.

Moreover, the ability to transmit audible content to the mobile robot 104, either via the network data bridge 202 or via a "memory stick"-type data bridge, permits the mobile robot 104 to "speak" instructions directly to the user of the mobile robot 104 at the time and place of use. For example, the mobile robot 104 may speak directions when in a demo mode that is initially run to demonstrate various features the mobile robot 104 can perform. Voice instruction to the mobile robot user can be accomplished by transmitting encoded audible content to the mobile robot 104 (either by installing such audible content on read-only memory (ROM) in the home robot at the time of manufacture, or by transmitting wirelessly or otherwise and storing the audible content in flash RAM, for example) and playing it back over an on-board decoder and/or synthesizer and speaker installed in the mobile robot 104. Synthesized speech encoded for decoding on speech synthesis hardware may require less on-board storage than non-synthesized speech; however, as an alternative, natural or computer speech may be recorded as wave-form encoded (and/or psycho-acoustically encoded) sound data and transmitted to the mobile robot 104 for storage and later playback. Alternatively, however, speech for playback on the mobile robot 104 may also be encoded as WAV files or compressed sound files (e.g., employing compression such as Lempel-Zev-Welch (LZW) or other techniques that are less computer-resource-intensive than, for example, MP3 or Windows Media (WMV) decoding).

As another example, by using a synthesizer, a phoneme string file to be downloaded to the mobile robot 104 may include and/or be thematically associated with, for example, an animation storyboard file including tags that trigger synchronized or asynchronous parallel movement events, lights (or other indicia) and/or non-synthesized sound. Using such a phoneme pattern and storyboard, a string such as "he-llo ha-w [which may here represent a tag to start a "bowing" trajectory in, trajectory out movement as an asynchronous ballistic behavior] a-re y-ou" may thus trigger the associated "bowing" robo-motion (e.g., thematic "dance" or emotive behavior performable by the mobile robot 104). Further, if sound recording hardware such as a microphone and sound processing hardware are installed in the mobile robot 104, as well as sufficient processing or transmitting capability, then the mobile robot 104 may include speech-recognition functionality in order to recognize spoken commands or other interaction from mobile robot users; also, the storyboarding capability as discussed above may encompass and encode responses and references to any of the functionalities or capabilities performable by the mobile robot 104.

An RF system used by the mobile robot 104, the network data bridge 202, the remote control, and/or the peripheral device 102 may include four radio transceiver modules that are located in the mobile robot 104, the remote control, the peripheral device 102, and the network data bridge 202. The remote control may use RF to transmit control signals to the mobile robot 104 using a bidirectional protocol or unidirectional protocol; also, the remote control unit may allow the user to "drive" the mobile robot 104 around as well as sending scheduling data created on the remote control unit. The mobile robot 104 may use RF to wake-up and power-manage the peripheral device 102 using a bidirectional protocol. The network data bridge 202 may use RF to transmit data and code updates to the mobile robot 104 as well as to upload diagnostic data from the mobile robot 104 using a bidirectional protocol. Furthermore, when there are multiple peripheral devices as well as the network data bridge 202 in operation, in which the peripheral devices and the network data bridge 202 can maintain an RF or other communication channel in a relayed fashion, the wireless robot network communication between the network data bridge 202 and the mobile robot 104 may be propagated along the chain of peripheral devices even when the mobile robot 104 is beyond the direct RF range of the network data bridge 202. The effective range of the wireless robot network can be extended by the linking of peripheral devices.

The 2.4 GHz ISM band may be used with either direct-sequence or frequency-hopping spread-spectrum transmission techniques. In addition, either a custom proprietary protocol based on some implementation of a standard 7-layer OSI model may be used, or the ZigBee 802.15.4 standard protocol may alternatively be used, inter alia. The custom protocol may allow for proper regulatory compliance in all countries of interest, for example, or alternatively, may be suited for each anticipated national market.

The following single chip, integrated RF transceiver radio modules are examples of chipsets that may be used to implement the RF system; Chipcon CC2500; Chipcon CC2420; Freescale MC13191; Freescale MC13192. A printed circuit "F" style antenna design may be used with either no external RF power amplification or a suitable RF power amplification depending on the range and power requirements.

Regarding a proprietary robot-net RF protocol, such a protocol may be simpler than Zigbee, for example, in that Zigbee has two parts—signaling (IEEE 802.15.4) and application (routing, etc.). As an alternative, the proprietary robot-net protocol may use 802.15.4 because the standard has driven down the cost of goods for antennas, microcontrollers, etc. The contemplated robot-net may however deviate from Zigbee (a meshed network with routing) at least in that it may be a point-to-point network. Under Zigbee, nodes would be required (in some cases) to route traffic for other nodes; this behavior may place excessive responsibility on Lighthouses, Remote controls, and RF data bridges, etc. Robot-net RF may include a sparse protocol that simply has robot or beacon control and reporting messages like WAKEUP, GO_CLEAN(robot-n), ERROR(robot-n, i-am-stuck), etc.

The savings in complexity may enable small amounts of memory (e.g., 8K) on some elements of the network. As an example, a Lighthouse may have 8 KByte of program memory. The point-to-point protocol may be simpler than Zigbee because it does not support routing of traffic from endpoints other than the home robot products, encryption of data packets, or many other features needed for meshing. Above this packet transport layer, robot-net may define messages that are specific to robot control and monitoring which are unique (lighthouses may also be configured to use the protocol, although they may be turned on and off by the robot extra-protocol). This control is unique even if implemented such that ZigBee forms a portion of the application layer, as a non-limiting example.

At least one of the endpoints may be mobile. Instantaneous signal strength, or signal strength over time can be used to help the robot navigate or correct beacon-based navigation, e.g., by providing additional data informing the robot that it is proceeding in the correct direction or in a failure mode, as non-limiting examples.

With regard to a vocal and multimedia demonstration mode executed e.g., just once when the mobile robot 104 is first used (and then the accompanying data being e.g., discarded to liberate system resources), or at any time when an appropriate "demo" button is pushed, the demo mode may include several speech files may be scripted in sequence; in which the script is not necessarily an interpreted script, but may simply represent a linear routine coded in any suitable manner. The script may flash the lights and buttons visible on the mobile robot 104, make sounds and cause the mobile robot 104 to do the things it is supposed to demonstrate (such as spot cleaning). The demo script may flash the lights or other indicia directly and run the behaviors directly, or could generate phantom presses/sensor events within the robot's computer control system to make the appropriate indicia and/or behaviors occur. For example, to start the spot cleaning demo, the voice routine could tell the user to press spot clean now (or could send a phantom button press to the UI control, which would flash the button as usual and start as usual. Other demos may be triggered by take signals forwarded to a virtual sensor, for example—demo of stasis/struck response by telling the mobile robot 104 it is stuck, etc.), then wait a certain period before reasserting control for the remainder of the demo.

The demo could detect that the user pressed the wrong button and redirect him, as well, for example.

Examples of "robo-motions" (interchangeably, "animotions") which may be transmitted either alone or as part of a theme or bundle may include new functional robot motions or behaviors such as spot-coverage, wall-following, and bounce operational modes, which may pertain to at least certain implementations of mobile robots in accordance with the present invention are specifically described in U.S. Pat. No. 6,809,490, by Jones et al., entitled, Method and System for Multi-Mode Coverage for an Autonomous Robot, the entire disclosure of which is herein incorporated by reference in its entirety.

In addition, according to one example, the mobile robot 104 may be provided with a speaker for playback of audible content, a wireless or direct link to the network data bridge 202 for receiving the audible content, and a processor (for example, a speech synthesizer, MIDI chipset and/or frequency modulation (FM) unit, etc.) for replaying the audible content. The audible content may have significant functionality—in a non-limiting example, a warning siren sound may be downloaded to provide a clear signal when the mobile robot 104 detects a potentially hazardous condition such as overheating of a vacuum motor, or a series of slowly-spoken instructions may provide hard-of-hearing or disabled mobile robot users with a more understandable tutorial on the use of the mobile robot 104. Furthermore, the audible content and/or theme may provide instructions or other speech in any of a variety of human languages or dialects; in addition, any behavioral or movement-based content such as may be associated with or included in a regional, national, linguistic, cultural, occupational, character or other such theme may also be appropriately correlated. For example, a "ballerina" theme might include spoken instructions affecting an accent reminiscent of a French accent, and a motion profile that causes the mobile robot 104 to perform pirouettes, spirals, figure eights, and other movements reminiscent of a dancer performing ballet, inter alia; this might also be associated with a body cladding set that would suggest a leotard, for example, to enhance the thematic effect.

The specific tying of certain content to certain behaviors is also made possible. For example, whenever the mobile robot 104 performs a certain "robo-motion" or trick (or less sanguinely, gets stuck, for example) such as a game of chase, it might play the "William Tell Overture;" alternatively, it may issue plaintive wails for help when the mobile robot 104 detects that it is lost cut off from communication with any beacon, the network data bridge 202 or a home base, or is otherwise stuck or stymied.

Figure 5:
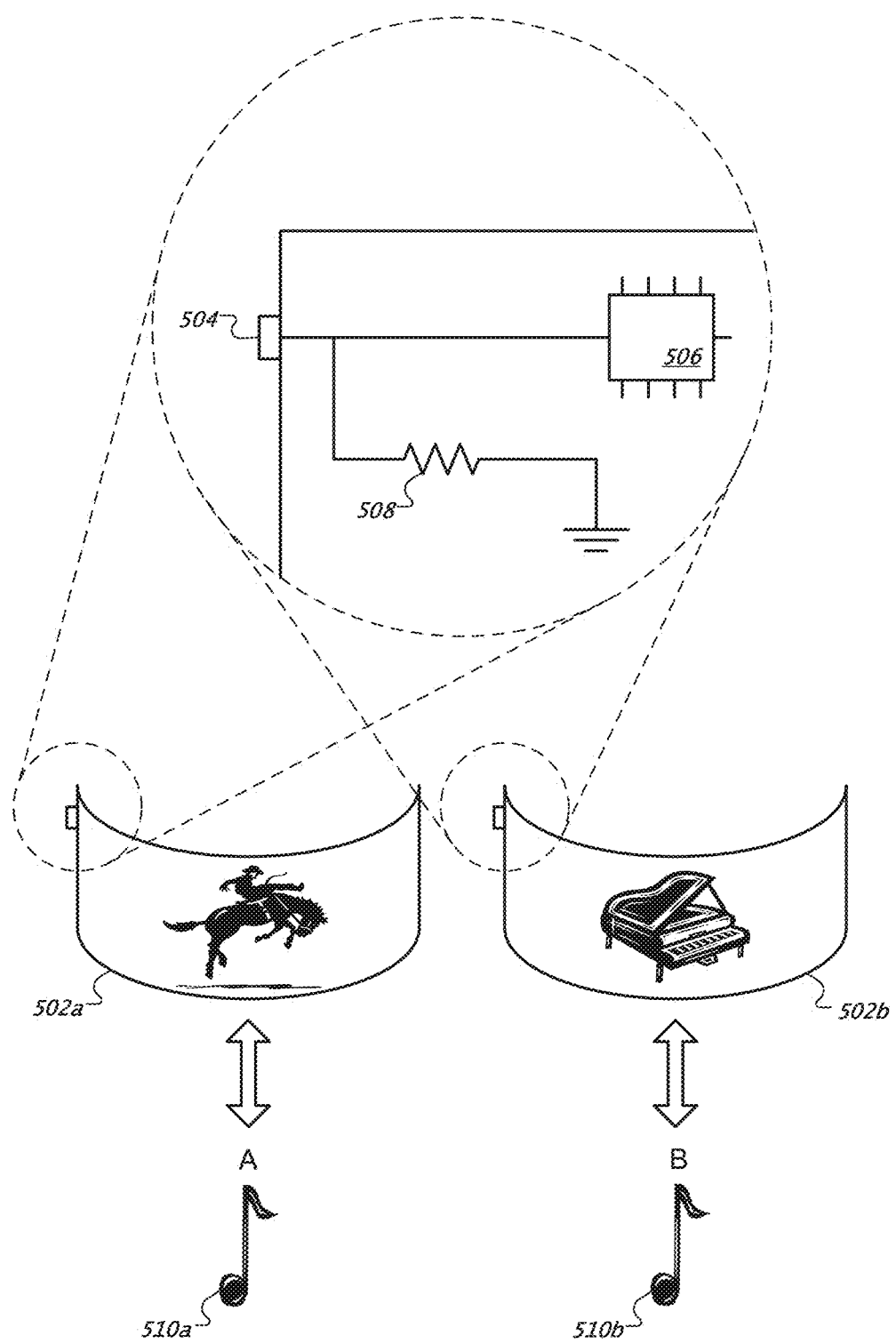
FIG. 5 is a schematic diagram showing an example of body panel themes for a mobile robot.

FIG. 5 is a schematic diagram showing an example of body panel themes for the mobile robot 104. The mobile robot 104 may include customizable, snap-on or otherwise interchangeable exterior panels 502a-b which may be "themed" for permitting mobile robot users to individualize their mobile robots. As an example, body panels may be molded from plastic and thereafter painted, dyed, or covered with an adhesive material; any suitable modality for coloring, designing or drawing patterns thereon may be used, as appropriate. As an example, a design may be applied to the interior of a transparent sheet-like polymer material, and then the polymer sheet or body panel may be applied to a molded plastic piece as a body panel; as a result, the design is protected by the transparent polymer sheet, while rapid theming of body panels in a "just-in-time" (JIT) distribution strategy may be achieved. The panels may also be customized by user content, e.g., primed by ink jet onto an appropriate material. For example, the user may upload a photo, which can be adapted to a template, and the JIT-made shell may be made and delivered at the appropriate time (e.g., x-mas panel with sounds of a user's own family singing Christmas Carols, e.g. uploaded to the server by the user earlier for inclusion into a modified or customized theme).

Furthermore, the interchangeable body panels 502a-b may include an identification system corresponding to audible or other thematic content that may be transmitted to the home robot to complete the theming effect. For example, the body panels include an electrical contact 504 which is positioned along the interior edge of the panels 502a-b so as to contact a corresponding electrical contact on the mobile robot 104 when installed thereon. The electrical contact 504 on the body panels 502a-b is operatively connected to an appropriate electronic identification unit, such as an integrated circuit (IC) 506 that outputs a voltage pattern corresponding to a unique theme ID number; and/or a specific resistance 508 which likewise corresponds to particular theme IDs 510a-b. Alternatively, the body panels 502a-b may include an RFID or passive magnetic device; a mechanical ID mechanism such as a punch-card like series of holes or peaks; an optical ID system such as a barcode or characteristic color; or any other modality suitable for identifying a body panel's corresponding theme. The ID can be transmitted by the mobile robot 104 back to the network data bridge 202 as authorization or identification to download corresponding themed firmware, multimedia, etc. to the mobile robot 104 as discussed herein.

As a default behavior, if no identification of the body panel can be made by the sensors of the mobile robot 104, the mobile robot 104 may e.g., reject theme content as potentially unauthorized; or, conversely, accept any theme material if there is little concern regarding unlicensed theme content.

Figure 8:
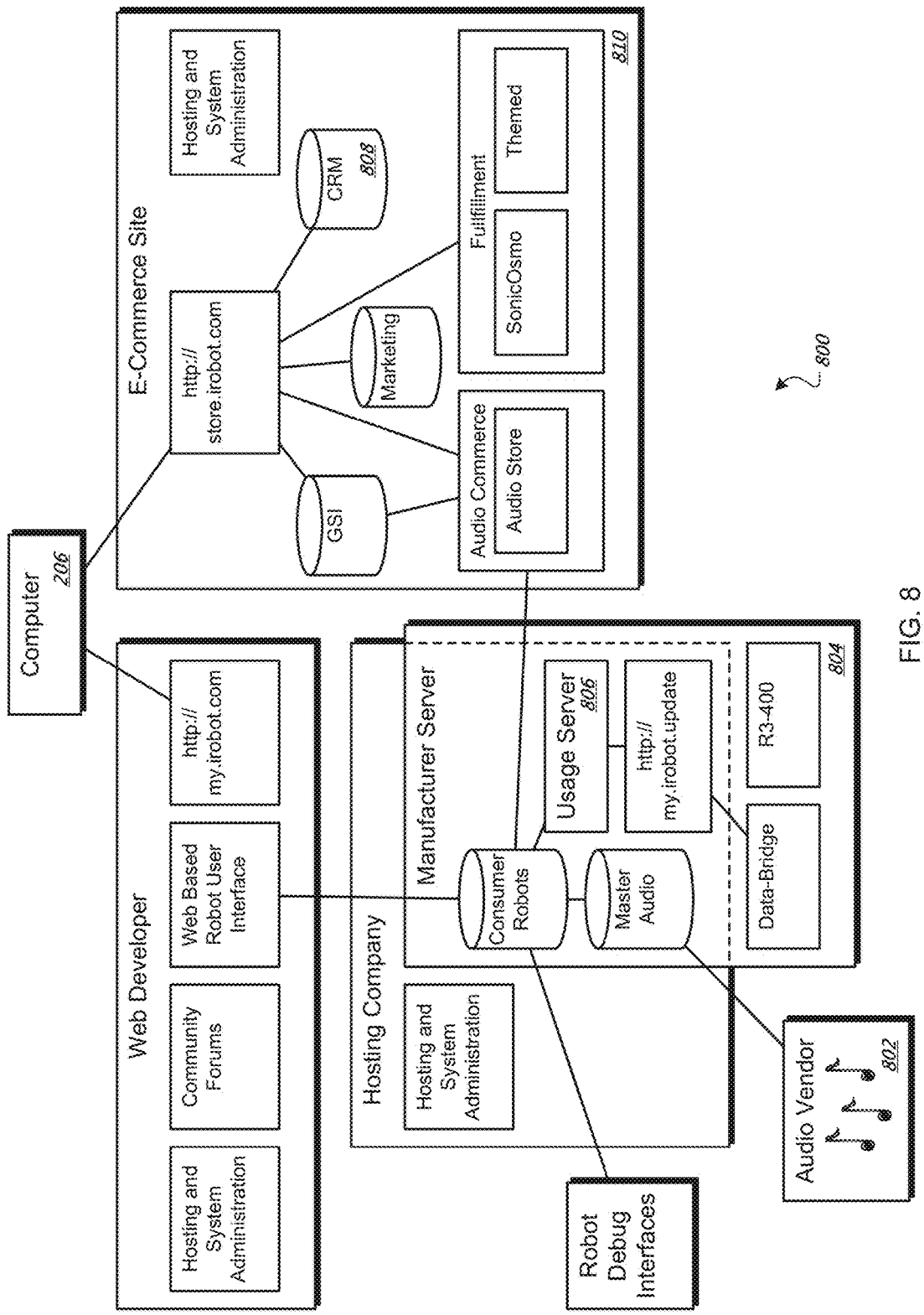
FIG. 8 is a schematic diagram showing an example of a robot system including a vendor and a manufacturer server.

FIG. 8 is a schematic diagram showing an example of a robot system 800 including a vendor 802 (as a type of audible or other content) and a manufacturer server 804. The system 800 acts as a content distribution system, in which the vendor 802 distributes licensed content to mobile robots ("consumer robots") under the supervision of licensing and security-checking systems ("big brother" 806, "CRM" 808) as a back-end to a consumer-oriented website administered by a robot manufacturer ("E-Commerce site" 810). In this example, "Rtoon" may signify distributable content, whether audio or other thematic material, for example.

Also, once an identification of the theme corresponding to an installed body panel is determined, the mobile robot 104 may wirelessly transmit information regarding the detected theme ID to the mobile robot manufacturer's server via the wireless robot network data bridge 202 and Internet, for example. The server may then determine whether audible or other content corresponding to the transmitted theme ID is available, and if so whether the corresponding content is properly paid for, licensed, etc. If all determinations are affirmative, the server may transmit the corresponding content (such as a set of audio data arranged as a sound theme and/or a set of robot "dance" commands, indicia patterns, etc.; to the mobile robot 104 via the Internet and the network data bridge 202, for example, alternatively, the serve may transmit an "unlock code" or cryptographic key for decoding encrypted and/or otherwise restricted content already present at the mobile robot 104; or, for example, the mobile robot manufacturer's server may cause a separate content server (e.g., belonging to a third party and under licensing and electronic distribution agreement with the mobile robot manufacturer, for example) to transmit such data to the appropriate mobile robot which sent the theme ID.

Figure 4:
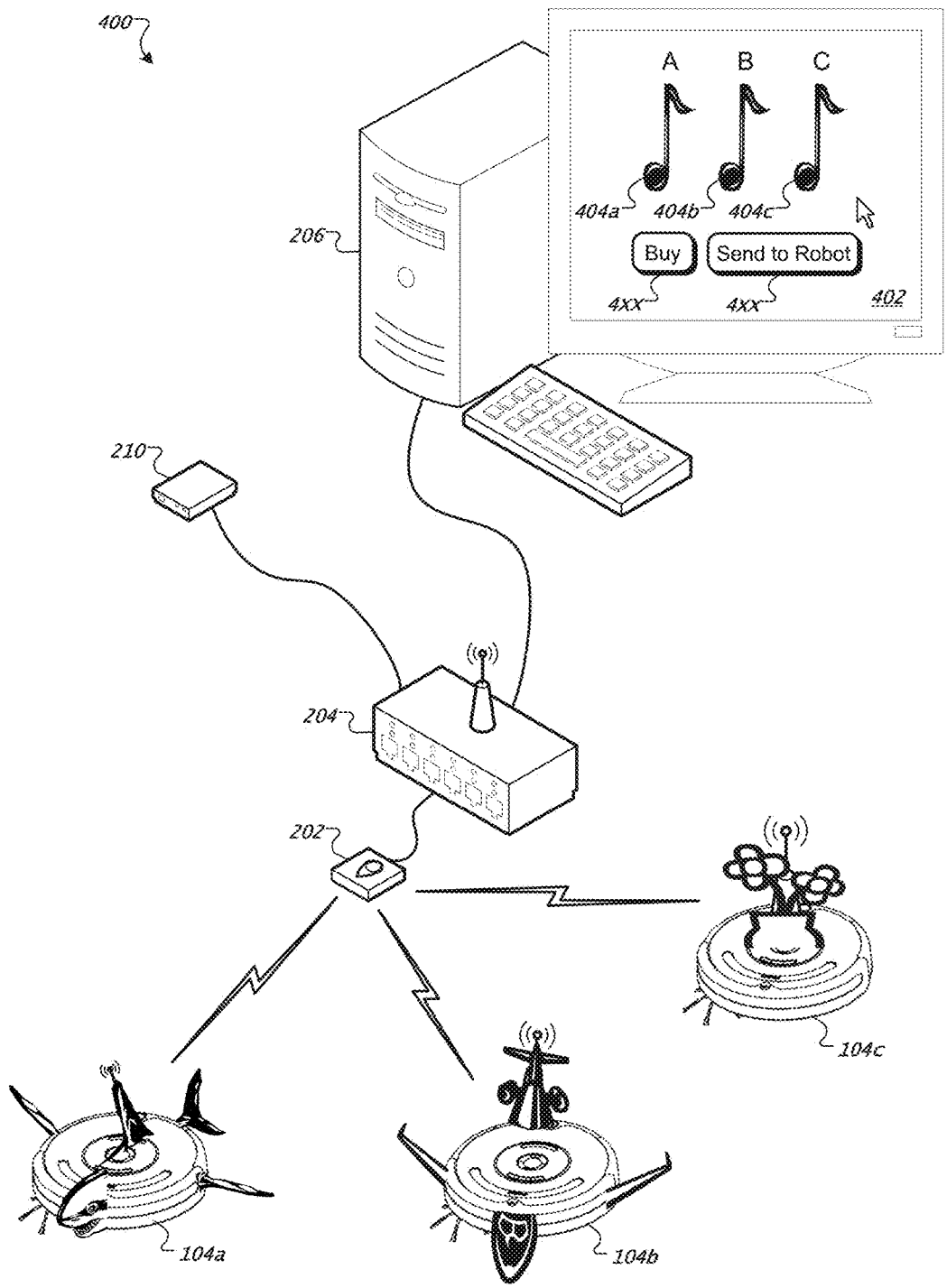
FIG. 4 is a schematic diagram showing an example of a robot system including mobile robots, in which a computer transmits themes to the mobile robots.

FIG. 4 is a schematic diagram showing an example of a robot system 400 including mobile robots 104a-c, in which the computer 206 transmits themes to the mobile robots 104a-c. Mobile robot users may receive new or updated musical, sound, visual, choreographic or other such thematic content winch corresponds to the themed body panels installed on their mobile robots. A website 402 displayed on the personal computer (PC) 206 offers a choice of three sets of music contents, 'A' 404a, 'B' 404b, or 'C' 404c, for transmittal to or activation on the mobile robots 104a-c).

Also, the theming may even extend to the content within themes—e.g., if a robot has several audio files or "earcons" loaded (e.g., in a format such as MIDI), and then selects a "steel drum" theme, the theme might include musical instrument element (e.g., also encoded as MIDI instruments or other suitable format) which replace the standard instruments that would normally be played in the earcons or sound files; as such, a rock ballad may be "themed" into a Caribbean anthem, as a non-limiting example.

With regards to the themed content, combinations of various interdependent (or independent) content types (e.g., including—but not necessarily limited to—sounds, body cladding, choreographed "dance" moves, behavioral response profiles, or the like, as non-limiting examples) are possible to permit a high degree of thoroughness in the impact themes may have on users. Sounds such as background music to be played while the home robot either sits idle or performs tasks; "earcons"—that is, sounds that convey meaning and which are played back when triggered by certain events or behaviors, such as the robot playing a car-crash "earcon" when the robot bump sensor detects a collision with an obstacle, or the phrase "feed me!" as an earcon when the robot's detergent or other consumable but is empty, inter alia, daily or monthly activity or activation schedules such that a "family dog" themed robot may cease hibernation or recharging mode when a sound corresponding to the delivery of the morning newspaper is detected, and then proceed to the users bedroom to "bark" and cavort about in figure "s" or semi-random movement patterns (or to "wag its tail" by rotating the hind portion of the robot repeatedly back and forth) adjacent the user's bed to wake the user or to get the user's attention in a manner reminiscent of an excited dog; a "listening" behavioral routine which may cause the robot to, for example, behave as a parrot (e.g., in combination with other parrot-themed content such as plumage-like body cladding, "whistling" sounds and a parrot-like gait for movement) and repeat back recently spoken words that are detected by an on-board microphone (e.g., in a distorted, squawking manner reminiscent of a true parrot, for example); and/or network-access patterns for robots equipped to communicate via a wireless network (for example, a "spy" theme might, in combination with various other thematic content, include a network access profile that might cease all network access for various periods of time when, the "spy" robot is expected to maintain "complete radio silence," for example; or conversely may be conditioned to frequently retrieve updated information from a network source in order to fulfill a role as a trivia quizmaster by downloading questions and/or answers to be posed to guests of the user while playing a party game, for example—indeed, such quiz questions and answers or the rules of a game might themselves be bundled into a theme in static format, as a further example of the broad extent of themeable content types). Also, content such as the "robo-motions" ("dance" moves or distinctive motions performed by wheeled or otherwise mobile home robots) may be triggered on command by way of voice command recognition, etc., on the robot such that the user may clap her hands or verbally instruct the robot to "beg" or "stand still" or "dance the Lindy Hop," and the robot would comply by performing the associated robo-motion, for example.

Functional themes may enhance the primary purpose (or any other purpose) of the mobile robot, as well—for a non-limiting example, a "super robot cleaner" theme might include behavioral patterns that cause the home robot to detect spots on the floor and to spend a particular proportion of cleaning time vacuuming or washing the spots discovered as a result of the theme.

User commands to initiate actions such as power on/off start, stop or to change a cleaning mode, set a cleaning duration, program cleaning parameters such as start time and duration, and or many other user initiated commands, functions, and/or components contemplated for use with the present invention are specifically described in U.S. patent application Ser. No. 11/166,891, by Dubrovsky et al., filed on Jun. 24, 2005, entitled Remote Control Scheduler and Method for Autonomous Robotic Device, the entire disclosure of which is herein incorporated by reference it its entirety.

For another example of a type of theme which encompasses a variety of behavioral audio, visual and other types of eclectic content, a mobile robot may be themed as a chess piece, such theme to include not only distinctive body cladding (with different types possible such as "knight," "rook," "pawn," etc.) and e.g., chess-themed music and sounds, but also e.g., a network behavior so as to coordinate with a central server (or possible to "swarm" with several other home robots also acting as chess pieces) so as to adopt the role of a particular piece on a chessboard, in which a user or users bring a plurality of home robots and arrange then in an environment simulating a chess board and command the home robots to move as chess pieces during a chess game; this high-level "chess" theme thus may include also the rules of chess and behaviors and movement patterns (as well as network routines and functions) of various chess pieces, as well as visual and/or audio content and the like, for example.

As illustrated by the above-discussed non-limiting examples, the content types that may be used and combined into theme packages may encompass a broad range of material, virtually as broad as the range of potential capabilities performable by the mobile robot 104, for example. The present inventors intend that the examples of associated themed content given herein can be generalized for the purposes of the invention according to their readily recognized type:

The chess and trivia game examples are examples of providing associated themed content linking at least two of a predetermined game rule set, game piece or paraphernalia set, game appearance, and game sounds.

The parrot and dog examples are examples of providing associated themed content linking at least two of a predetermined entity (i.e., animal or person) motion set, appearance, and sounds. This would extend to celebrities, so called "licensed properties" linked to well-known entertainment programs or books, characters and the like.

The ballet example is an example of providing associated themed content linking at least two of a predetermined dance move set, paraphernalia, appearance, music, and sounds.

The country-and-western example below is an example of providing associated themed content linking at least two of a musical genre move set, paraphernalia, appearance, music, and sounds.

Mobile robot users with Internet-capable personal computers, cell phones, PDAs, and other devices may also browse the home robot manufacturer's server via a web site and select themes, sounds, tones, "dances," software, or other suitable mobile robot content for download and/or purchase. (For example, a user interested in quelling potential sources of RF interference in her home, or for conserving bandwidth for other tasks, might purchase a low-RF-noise network profile content from a manufacturer's website, for example.) The user interface presented to the user may also be customized to match the robot theme as well—that is, a theme may include multimedia content that can be manifested on the robot but also on an online interface that is associated with the robot having the theme, and with which the user interacts when using the online interface and/or the robot.

Also, users may select themed body panels, base stations, batteries, accessories, new home robots, data bridges, etc., from the web site, and have the items shipped to their home. Items such as body panels may then be ordered in bulk in blank form by the manufacturer or reseller who operates the web site, and then apply themed designs rapidly and "just-in-time" after (or before, when sales prediction analysis is properly applied) receiving an order from a home robot user.

Furthermore, themed items may be accompanied by a CD-ROM, floppy disk, "memory stick"-type data bridge, or other data medium in order to transmit the appropriate corresponding themed content to the home robot upon installation of the ordered themed item. Alternatively, the mobile robot manufacturer or reseller may omit shipping data media along with physical items, and instead offer Internet-based transmission of the corresponding themed content (via the wireless robot network data bridge, for example), or do so when orders are received from customers who the manufacturer or reseller has a record of having previously bought the network data bridge 202, for example for when records show that the customer already has the most up-to-date version of the appropriate themed content). The mobile robot manufacturer or reseller may reduce shipping charges when it is known that the ordering customer has the ability to update the mobile robot 104 via the network data bridge 202, for example.

Moreover, by virtue of the online ordering system and manufacturer's or reseller's website, customers may be offered a variety of functional and thematic combinations for body paneling, sounds and music, "dance" routines, and indicia flash patterns (and/or one-off or single-item offerings in a "mix-'n'-match" mode, such as a Country/Western paneling-themed robot with a rock'n'roll "dance" routine and a classical piano sound theme, in a non-limiting example). For example, the County/Western theme body panel 502a is linked to music content 'A' 510a; and the piano theme body panel 502b is linked to music content 'B' 510b (which would usually be piano-related). Additionally, accessory replacement and service reminders tied to usage can be contemplated—e.g., reminders to replace the batteries after a certain number of recharge cycles or hours expended. The online service may be configured to enter a recommended replacement part (to replace a part recorded as having accumulated sufficient cycles or time to be worn according to the uploaded data) or a consumable material such as detergent, cat food, lubricant or any other such material (to augment the stock of the consumable material recorded as needing replenishment) into the user's online shopping cart or one-click purchase queue, as non-limiting examples.

Other aspects of such a website may be handled in a conventional manner, by permitting online credit card or check payment, etc. As an advantage, customers may place orders for a customized home robot with their choice of complete theme or a "mix-'n'-match" robot (e.g., a male lion vs. a female lion) personalized to the users' own variegated tastes and styles. Moreover, by using laser printing or other modality for applying digital images and/or writing to the polymer sheet panel coverings discussed above, users may be offered the option to apply slogans, names, or any arbitrary writing and/or images to be printed on their home robots, for example.

A further example permits the user to create or record his or her own sounds or music content and to transmit this custom content to his or her home robot. In order to address licensing and unauthorized duplication concerns, the home robot manufacturer may employ a media and/or authoring software protection scheme, for example, such that only licensed copies of the authoring software will junction properly and such that only content produced on a properly licensed copy of the manufacturer-provided software will correctly play back on that manufacturer's home robots, for example. As a non-limiting example, public-key encryption techniques may be applied in which each robot receives a public key known to the user (such as a serial number, for example), and a private key known only by the manufacturer. Accordingly, when a home robot user purchases a copy of the content authoring software from the manufacturer, the copy that the home robot user receives may "watermark" its output content with the encryption key such that only the particular user's home robot can pay back the output content, as a non-limiting example. Other encryption or protection schemes may be employed to allow wider or narrow distribution, as appropriate to business and license/copyright protection concerns.

As a further example, users may be offered a content subscription service in which a number of themes and/or audible or other content are made available per month or other time period to the uses who purchases the subscription. As an advantage, users can be assured of the integrity of the content they download and copyright concerns can be addressed.

Figure 9A:
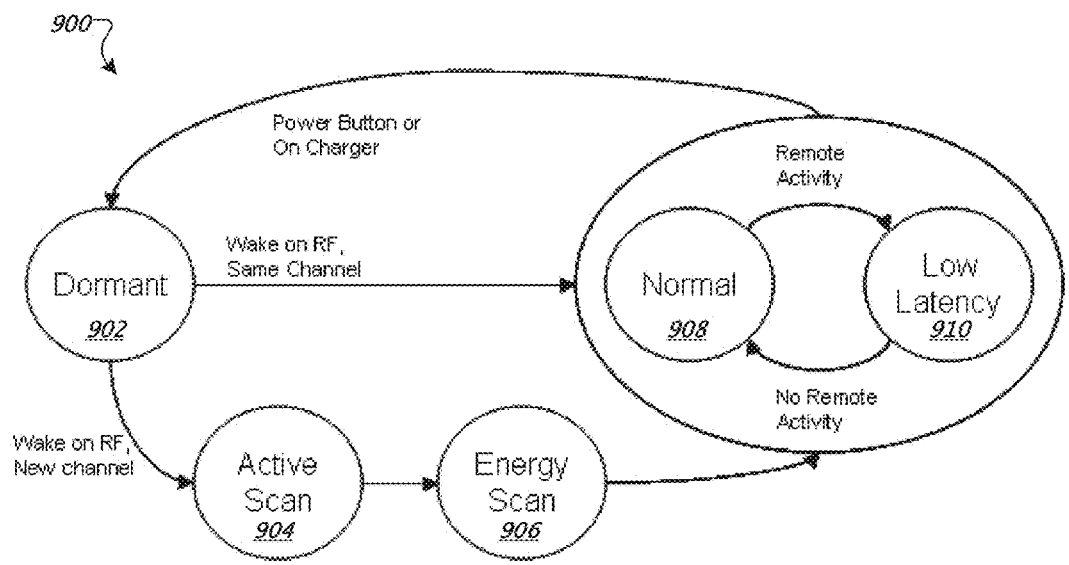
FIG. 9A is a state diagram showing an example of a state machine for a mobile robot.
Figure 9B:
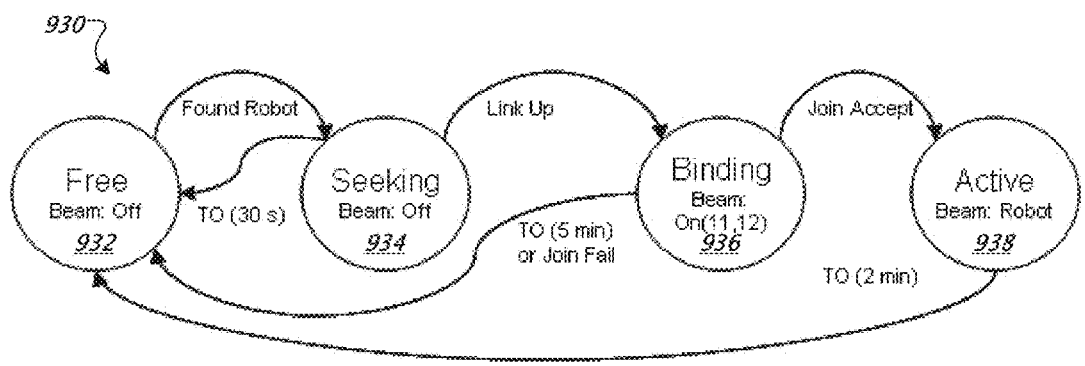
FIG. 9B is a state diagram showing an example of a state machine for a mobile robot.
Figure 9C:
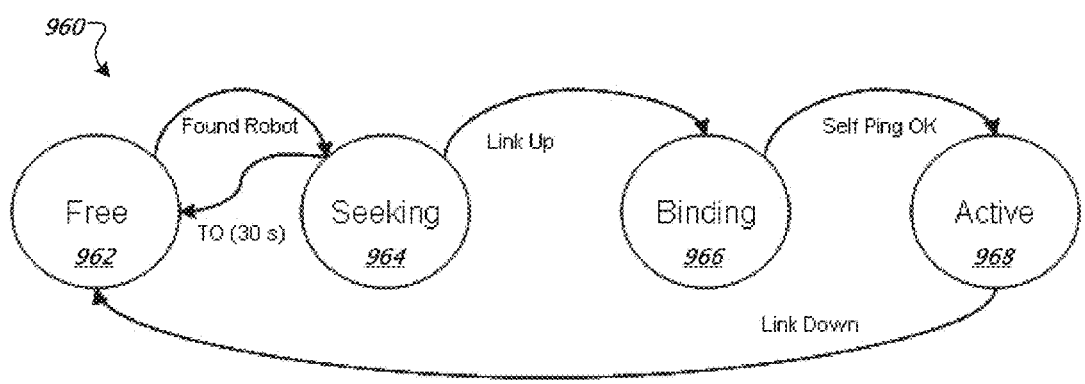
FIG. 9C is a state diagram showing an example of a state machine for a mobile robot.

FIGS. 9A-C are state diagrams showing examples of state machines 900, 930, and 960 for the mobile robot 104, the lighthouse peripheral device 102, and a remote control peripheral device, respectively. The Robot Personal Area Network (RPAN) protocol used by the network data bridge 202, the mobile robot 104, and the peripheral device 102 can be used in many ways as defined by applications.

FIG. 9A shows a high level state diagram that serves as a reference for the following discussion. The mobile robot 104 is an RPAN master responsible for several tasks, such as providing a unique address to isolate communications with its peripherals from other RPAN systems, deciding on a radio channel to use, operating on the common channel as necessary to report this operational channel, and transmitting a beacon which defines time windows that peripherals should use to communicate.

When the mobile robot 104 is conserving power in its dormant state 902 or charging, the RF network is inactive, meaning that no beacon is transmitted. While in this state 902, the mobile robot 104 can be woken up over RF by executing the following steps in a constant loop.

1. Turn on radio on the Common Signaling Channel (CSC).

2. Send "Activate invite" broadcast message.

3. Listen for "Activate Request" message for up to 30 milliseconds.

4. Receive "Activate Request" message and leave Dormant state. Or, turn off radio and sleep for 970 milliseconds.

Therefore, every second the mobile robot 104 invites peripheral devices, such as the peripheral device 102, to wake it up. A peripheral wanting to wake up the mobile robot 104 will listen, for a second for the "Activate Invite" message and respond promptly with the "Activate Request" message which wakes up the mobile robot 104.

When the mobile robot 104 has been woken up to active scan state 904, it checks if its radio channel is still valid. If the robot sleeps for more than 10 minutes, the radio channel will be reselected. This time is chosen to safely exceed any session oriented timers. The first step in respecting a channel is to actively scan for other RPAN masters and exclude then channels from the set of acceptable channels.

An active scan is performed by sending two "Ping" messages on the CSC to the broadcast RPAN address. The mobile robot 104 listens for 30 ms alter each message for "Ping Response". Each "Ping" message is separated by 360 ms.

After ruling out radio channels through active scanning the mobile robot 104 moves to energy scan state 906, candidate channels are scanned for energy levels in order of preference. On a given channel 100 energy level samples are obtained in about 100 ms of time. The first channel to have an average energy level below an acceptance threshold is chosen as the new operational channel. In the unlikely event that no channels meet these criteria, one is randomly chosen.

When the mobile robot 104 is operating its RF network normally, then it is in normal state 908 and it transmits a beacon every 720 ms which is called the "beacon period". In that beacon message, a window of time following the beacon which is valid for devices to communicate is advertised. This "contention access period" is set to 220 ms in the normal mode. While not in the contention access period, the robot operates on the common channel to answer "Ping" messages with "Ping Responses" advertising the radio channel on which the robot is operating.

The motivations behind the specific beacon and contention access periods chosen are as follows: to keep beacon tracking overhead low, to keep radio power consumption low, and to allow peripherals with very inaccurate clocks to reliably find robots. This final goal is satisfied by defining one more time constant which is the "ping separation period". If a peripheral sends two pings separated by 360 ms, the real time assuming the clock is plus or minus 30% is anywhere between 252 ms and 468 ms. On the low side, the 252 ms is sufficiently high so that both pings will not occur while the mobile robot 104 is on the operational channel. On the high side, the 468 ms is smaller than the 500 ms that the mobile robot 104 is listening on the common channel guaranteeing that one of them will be receiving during that time. There are other combinations of values that work. Also, with higher clock accuracy the contention access period duty cycle can be higher. These values can be recalculated for other systems based on those needs.

The 500 ms when the mobile robot 104 is operating on the common channel represent a dead time that can be unacceptable at times. One such time is when the mobile robot 104 is being driven remotely. Another is when the mobile robot 104 sensors are being monitored for diagnostic purposes. When low latency state 910 is needed, a peripheral may send a "Low Latency Request" message which contains a byte representing the number of seconds that low latency mode should be used. The low latency time can be refreshed with subsequent messages. Also, the mobile robot 104 itself may switch to low latency mode.

FIG. 9B shows the state diagram 930 that serves as a reference for the following discussion. In this section, message shows between the mobile robot 104 and the lighthouse peripheral device 102 are illustrated. A peripheral device, such as the lighthouse peripheral device 102, may be a simple slave device.

The slave 102 begins in a low power consumption state 932 designated as "Free" in the state diagram 930. In this state 932, it wakes up periodically and attempts to join a robot network. It does this by setting its channel to the common signaling channel (CSC is the 5th channel). It then sends a broadcast message to ask any robots who are listening on this channel to respond. The response from a robot hearing this message advertises a network with an ID on an appropriate channel (zero based numbering). This is the same active scanning process described above. The lighthouse 102 will get 0 or more responses in the two 30 ms windows of time it listens after sending the requests. If none are received, it will go back to sleep and perform another active scan in 4 seconds. If one or more are received, it will choose to join the network of a mobile robot whose response message was received with the greatest signal strength value.

If the lighthouse 102 has ever received a Join Accept message from a robot, that robot's RPAN ID is used instead of the broadcast address in the ping message. In this way, the lighthouse 102 will not waste power waking up for a robot that is in RF range but not its owner, e.g. the neighbor's mobile robot.

If the lighthouse 102 wants to join a robot's network and does not have an assigned address, the lighthouse 102 will randomly select a MAC address (marked as "Soft" in the MAC header) to use temporarily until the robot assigns one to it.

In "Seeking" state 934, the lighthouse 102 changes channels and listens for the beacon emitted periodically by the mobile robot 104. It should pick this up within a few seconds at most. If this does not happen, a timeout (30 seconds) will send it back to the "Free" state 932.

If all goes well and the beacon is found, the lighthouse 102 will advance to "Binding" state 936. In the "Binding" state and subsequent states, the lighthouse 102 will filter packets from other robots and monitor its link to the RPAN network from the MAC layer beacon tracking. These are shown in the state diagram as "Link Up" and "Link Down" events.

Upon entering this state 936, the robot will send a "join request" message. This starts a timer on the lighthouse 102 getting accepted into the network within 5 minutes. If that expires, the lighthouse 102 will return to "Free" 932. (This 5 minute time period is known to both the robot 104 and the lighthouse 102 so that each can expire their pending Whenever the robot 104 receives a join request that causes a collision of soft MAC addresses in its table, it will send a join rejection message that does not need to be acknowledged, and the entry will not go into the table. The lighthouse 102 (and perhaps the other lighthouse with the colliding MAC address) will follow the Join Fail event on the state diagram which will result in regenerating a MAC address and trying the bind again.

When the robot 104 receives a join request message and wants to delay the binding until another handshake is performed as is the case with lighthouses, it sends a join pending message. A join pending message is needed if an acceptance or rejection will not be sent within 3500 ms.

While acceptance is pending, the lighthouse 102 will transmit a 4-bit code in the confinement beam (11) which indicates that it has not bound to the robot. When, the robot 104 runs into a code 11 beam, it stops and looks at its list of lighthouses requesting bindings. For each entry, it issues a command to wink the code to 12. If that command is not acknowledged or the beam change is not seen, the lighthouse 102 is not in range, and the robot 104 moves on to the next entry on the list. If the robot 104 succeeds in seeing the beam, it sends a join accept message which moves the lighthouse 102 into Active state 938 where it obeys beam commands requested by the master. The beam command message contains the state of beams as well as the 4-bit code that should be in the beam.

While a lighthouse is in the binding state 936, it will probably lose contact with the robot 104 as it moves around a room and throughout a house. Losing the beacon for over 2 minutes returns the lighthouse 102 to the "Free" state 932 where the beams are off and power is being saved. When the robot 104 is back in range, the binding procedure is skipped since the assigned address is still valid.

After the lighthouse 102 has been bound to the robot 104, it will probably lose contact with the robot 104 as it moves around a room and throughout a house. A "Roam Recover" state is designed so that the binding process does not have to be repeated following each of these expected losses of communication. A gross timeout of 90 minutes is shown in the state diagram which puts the lighthouse back in a state where re-binding is necessary. The MAC address assigned is now considered expired.

The binding process is designed to obviate the need to assign static MAC addresses to simple devices of which there can be multiple talking to a robot at once. The assignment of addresses by the robot 104 can simply amount to cycling through a list of valid addresses. If the assigned MAC addresses are to expire some time after the bind, it greatly reduces the chance that the user could cause a configuration error.

For example, if there were a procedure the user needed to follow to assign. MAC addresses to the lighthouse 102 (e.g. install the batteries, place in front of robot, and hit button sequence on robot), he might do this successfully for the two included in the initial package. If the robot 104 ever forgot the last one assigned due to a code update or software problem, he might assign a conflicting address in the future if the user purchased an additional one later. Or, if the user replaces the robot 104 and then uses it to configure a new lighthouse, a conflict is very possible. Having the lighthouse MAC addresses expire tends to heal all such problems. One drawback to expiring addresses is that memories of what lighthouses the robot 104 encountered while cleaning are forgotten. These memories are potentially useful in having the robot 104 clean different rooms on different days. In either case, the age of a MAC address is specified in the "join accept" message giving the robot 104 (hence future software revisions of the robot 104) the freedom to make such decisions.

FIG. 9C shows the state diagram 960 for the remote control. The remote is used to drive the robot 104 around program its schedule. The remote control has a group address and does not require a numeric address.

From power saving state 962, the pressing of a button triggers seeking state 934 and the search for robots on the common channel. The search is performed at a very low power setting if the RPAN ID stored in non-volatile memory is blank. Otherwise, full power is used. In this way, a robot in very close proximity will respond to an unpaired remote.

The search can be described by the following loop which is executed continually until a robot is found or until the remote puts itself back to sleep due to inactivity.

1. Operate radio on CSC responding to Activate Invite messages (1 second).
2. Perform 1 active scan (360 milliseconds).

If the active scan collects responses, the remote moves to binding state 936 and the robot with the highest signal strength is selected. The remote switches to the robots channel and gets link by tracking the beacon, it then sends a ping message to itself. If it gets a response, then that means another remote control is using the group address. If no response is received, the remote is in active state 938 and is allowed to control the robot 104.

If the remote successfully communicates with the robot 104 on the operational channel, that robots RPAN ID is programmed into the remote controls non-volatile memory. The remote control communicates with the robot 104 as long as it is awake and buttons have been pressed recently (60 seconds). If the beacon is lost for over 10 seconds which is how Link Down is configured on the remote, it tried to find a robot again.

A paired remote control can be unpaired by installing the batteries with the left drive button depressed and keeping it held down for three seconds. It is then paired as part of the robot discovery algorithm described above.

Driving the robot 104 and operating its user interface remotely is accomplished by sending button states to the robot 104 and receiving LED states from the robot 104. These are updated when they change as well as at a refresh interval. In this way, the remote can be thought of as a dumb terminal.

The following describes the design of RF communications system for a robot system, such as the robot systems 100 and 200. The communications system performs the following actions: wake to RF for lighthouses and robots, remote control and lighthouse beam control commands, low power consumes a low amount of power, occupies a small RAM/ROM footprint, code and sound download, coexists with common interferers found in such environments, coexists with other robot systems in proximity as will be common in the mobile robot 104 development labs and some home environments, provides a simple growth path at each layer of the networking hierarchy.

The RF communications stack to be used on the robot systems 100 and 200 is discussed in a layer oriented approach starting from lowest and ending with the highest. The approach is based on the seven layer Open Systems Interconnection (OSI) Reference Model.

The physical layer uses the 2.4 GHz direct sequence spread spectrum (DSSS) modem as is specified in IEEE 802.15.4. The physical layer supports the following features: 16 available channels; energy detection (ED) provided on demand; clear channel assessment (CCA) using energy, carrier sense or both; and link quality indication (LQI) provided with packet reception.

The MAC layer provides the ability for a device to transmit broadcast and uni-cast messages to other devices within radio range. This does not preclude any topology from being supported in the future. However, layers above this MAC layer will impose restrictions. The MAC layer supports the following features: single master and multiple slaves, master sends beacon containing the beacon period and active period which allows a slave device to track the beacon knowing when to listen and when to save power, slave tracks beacon to establish link status, master can be told by higher layers to listen on the network establishment channel during idle periods of the beacon, a 16-bit Robot Personal Area Network Identifier (RPAN ID) to allow devices to filter packets not on the robot network of interest when channel is shared, group identifier in addresses include allow broadcast to specific device types and obviate need for unique MAC addresses for many types of peripherals, collision avoidance algorithm using CCA and random back-off, and reliability through acknowledge requests and automatic retry.

Including acknowledgement in the MAC layer was done for the IEEE 802.15.4. This may bring the MAC layer up to par with wired media such as half duplex Ethernet where collision detection can be used to give the sender a high level of confidence that the packet arrived at the destination. Network layer acknowledgement schemes may be needed when bridges and routers between the sender and receiver have the potential to drop packets due to resource constraints. Either MAC layer or network layer acknowledgement can be made to suit the needs of this network.

The MAC layer acknowledge is time sensitive since there is no addressing information contained in the packet. If the acknowledgement is sent very quickly, it is unlikely to collide with a new data packet or be confused as an acknowledgement to the new data packet. The sequence number reduces the chances of processing the wrong ACK.

An acknowledgement at the network layer is not as time sensitive since the packet contains addressing information. However, more time is wasted sending this extra information and the latency is worse as information is passed between layers. More state information is potentially needed to remember which packets have not been acknowledged unless head of line blocking is used.

Avoiding time critical processing of packets is not desirable, but there may be situations in which it is used. If another robot or an IEEE 802.15.4 device is operating on the same channel, the receiver may need to promptly parse and discard a valid packet not intended for it. To the extent it delays, it risks not listening when a packet intended for it is received. After factoring this in, it may be appropriate to include the ACK and retry feature at the MAC layer and take steps to mitigate the imposed real time constraints.

Again, an acknowledgement scheme implemented at the MAC or network layers can be made to work. If the MAC layer proves problematic, due to any of the concerns expressed above, the acknowledgment scheme can be implemented at the network layer.

The network layer is responsible for establishing membership in a network. The role of a master device and a slave device are different at this layer. The network layer supports the following slave features: network discovery using low power active scanning on common channel, can issue requests to join a network using a temporary random MAC address, and can participate in a network without any joining transaction if MAC address is known. The network layer supports the following master features, channel selection when network is started based on best available channel, and management of join requests sent on the common channel including assignment of MAC addresses to slaves using temporary ones.

The 16 available channels are discussed in a zero based manner (0-15). Channel 4 does not get 802.11b interference in the USA or Europe. As such, it is chosen as the common signaling channel used for network joining procedures.

The defined MAC layer draws an IEEE 802.15.4. Some concepts borrowed include the CSMA-CD algorithm, the reliability feature, and the beacon concept to some extent. The PAN coordination features are replaced with a method more targeted to the more limited needs of the higher layers.

The MAC layer is based on the presence of a master who generates beacons which define a period of active communications during which any device can talk to a device. Slave devices track this beacon to determine if the robot is present and when it can save power. The mobile robot 104 is the master device and is responsible for transmitting the beacon and managing slave devices. Slave devices track the beacon of the master so they know when they should listen for the next beacon, when they can communicate with other devices, and when they should turn off their RF modems to save power.

The MAC layer header includes a field designed to conflict with the IEEE 802.15.4 frame type field so that such a MAC device should reject it as an invalid frame type, and is otherwise designed to allow multiple RPANs to share a single channel. The RPAN ID field is in a fixed location in the packet, so a receiver can filter on a particular RPAN much like a Virtual LAN (VLAN) in Ethernet.

Beacons are transmitted by a master at periodic intervals. One reason is to imbed information about when the slave devices should expect to exchange messages with the master. This duty cycle control allows some level of power saving even during active operational modes. The second reason for transmitting beacons is to provide a constant status on the proximity of the robot. The goal is to unburden application layer software from doing this task.

A beacon is sent periodically as specified by the Beacon Period which is specified in the beacon itself. So, a slave receiving a beacon knows when to expect the next one. An Access Period is specified in the beacon, as well. This dictates the period of time during which the master will be active on the channel. Slaves should pay attention during this time and may shut down their receivers at other times. The sequence number in the beacon allows the slave to detect one or more missing beacons.

When a master specifies a small active period relative to the beacon period, it gives it the opportunity to spend the idle time listening on the CSC to admit new peripherals into the network. As such, the beacon periods may be set in a manner related to the period that peripherals use to wake up and try to join a network.

A typical beacon period may be on the order of a second. The jitter of the beacon message is relatively high considering the random nature of the back-off algorithm. Also, the slaves should not be burdened with having to manage events with a high level of temporal precision. Subject to the clocking requirements discussed later, the slave should define a "beacon window" which is a time period centered on the next expected time a beacon will be received. The slave should listen for the beacon during this window. The window ends when the expected beacon is received, ideally. If no beacon is received, the window ends, but the slave operates during the access period as if it received one. When a beacon is missed in this way, the window is lengthened for the next beacon since clock inaccuracies add. Once too many beacons have been missed, a loss of beacon is declared and the slave just listens constantly until it reacquires it. The loss of beacon condition is analogous in the Ethernet world to losing link. The master transmits beacons with a tune accuracy of less than 0.1%.

The MAC engine is based on a 250 microsecond process tick in order to simplify the management of state timers and avoid busy waiting. It should be a design goal of the implementation to insure that the processing in a single tick never exceeds 125 microseconds in order to leave plenty of processor available for other more critical tasks. In 250 microseconds, 7.8 characters can be transmitted at the fixed band rate of 250 kbps. Including the preamble and PHY header, the smallest possible packet is 8 characters long. This means that two CCA functions performed in consecutive ticks will almost certainly detect an ACK in flight.

The collision avoidance algorithm is invoked whenever there is a packet ready to transmit. The transmitter will delay a random number of back-off periods before running the CCA function. On the tick where the CCA function has completed, the transmitter will start sending if the CCA returned saying that the channel is clear.

The dead time between a packet reception ending and an ACK starting is between one and two ticks. So, a CCA function that does its best to prevent stepping on the ACK is one which performs two CCA measurements spaced a tick apart and declaring the channel clear if both pass. The back-off period is designed to be longer than the transmission time of a small packet such as an ACK, so two ticks is chosen.

If a data frame is received with acknowledgement requested with a matching destination address, the receive prepares to send an acknowledge packet provided that it will be able to pass the buffer along to the application. The receiver waits one tick to give the sender time to switch its transceiver into receive mode, then transmits an acknowledgement which is the first 2 bytes of the MAC header echoed with the frame type changed to an the ACK value. The sender expecting an ACK will wait for up to five ticks (1.25 ms) to receive the reply before retrying the transmission. Up to three retries are performed. If an acknowledgement is requested, the sender should postpone sending the packet if there is not enough time remaining in the current active period for the receiver to send the acknowledgement.

Data payloads in this network begin with the Transport Header which consists of a byte specifying the Service Access Point (SAP). This multiplexes different types of services onto the same device address. Previously, this has been accomplished using the "opcodes".

Device Control, Device Status Request, and Device Status SAPs are related in that the pay load messages use the same code points on a per device basis. That is to say that devices will have a published set of control and status information elements consisting of an element code followed by a known number of element payload bytes. If controllable over RF, the Device Control SAP is used to set values. Controllable and observable items can be queried with a Device Status Request. The actual status is delivered using the Device Status SAP whether solicited, i.e. requested over the Device Status Request SAP, or unsolicited, i.e. sent spontaneously. Alarms and other indications may be delivered in this way.

The reason to use multiple SAP codes for this related functionality is that it may a major portion of the overall RF traffic. As such, the smaller the packets can be made, the more reliable the transmission. So, for critical control and status messages, having a two byte header <Device_SAP><Control_Cmd> or <Device_SAP><Status_Cmd> keeps the PHY and MAC headers as small as possible.

"ROBOT OBSTACLE DETECTION SYSTEM", U.S. Pat. No. 6,594,844, disclosing proximity sensors such as cliff sensors and wall following sensors; "AUTONOMOUS FLOOR-CLEANING ROBOT", U.S. Pat. No. 6,883,201, disclosing a general structure of an iRobot. Roomba coverage/cleaning robot and main and edge cleaning heads in detail; "METHOD AND SYSTEM FOR MULTI-MODE COVERAGE FOR AN AUTONOMOUS ROBOT", U.S. Pat. No. 6,809,490, disclosing motion control and coverage behaviors, including escape behaviors, selected by an arbiter according to the principles of behavior based robotics; and "METHOD AND SYSTEM FOR ROBOT LOCALIZATION AND CONFINEMENT", U.S. Pat. No. 6,781,338, disclosing virtual walls, i.e., robot confinement using wall-simulating directed beams, are each incorporated by reference herein in their entireties.

Other robot details and features combinable with those described herein may be found in the following U.S. patent applications filed concurrently herewith, entitled "AUTONOMOUS COVERAGE ROBOT NAVIGATION SYSTEM" having assigned Ser. No. 11/633,869; "MODULAR ROBOT" having assigned Ser. No. 11/633,886; and "COVERAGE ROBOT MOBILITY" having assigned Ser. No. 11/633,885, the entire contents of the aforementioned applications are hereby incorporated by reference.

A number of implementations have been described. Nevertheless, it will be understood that various modifications may be made without departing from the spirit and scope of the following claims. Accordingly, other implementations are within the scope of the following claims.

What is claimed is:

1. An autonomous mobile cleaning robot comprising:
   a drive system to move the mobile cleaning robot about an environment;
   a wireless communication component configured to detect wireless signals emitted by a plurality of devices in the environment; and
   a controller configured to
      determine a location of the mobile cleaning robot by measuring strengths of the detected wireless signals to determine distances between the mobile cleaning robot and the plurality of devices, and
      control the drive system to navigate the mobile cleaning robot about the environment based at least in part on the determined location and the measured strengths of the detected wireless signals while the mobile cleaning robot performs a vacuuming, brushing, or mopping operation.

2. The mobile cleaning robot of claim 1, wherein configurations of the controller to control the drive system to navigate the mobile cleaning robot about the environment based at least in part on the determined location and the measured strengths of the detected wireless signals comprise configurations to prohibit movement of the mobile cleaning robot into an area of the environment based on the detected wireless signals.

3. The mobile cleaning robot of claim 1, wherein configurations of the controller to control the drive system to navigate the mobile cleaning robot about the environment based at least in part on the determined location and the measured strengths of the detected wireless signals comprise configurations to guide movement of the mobile cleaning robot into an area of the environment based on the detected wireless signals.

4. The mobile cleaning robot of claim 1, wherein the controller is further configured to
   detect a loss of communication between the wireless communication component and one of the plurality of devices, and
   provide a user indication indicative of the loss of communication.

5. The mobile cleaning robot of claim 1, wherein the wireless signals comprise electromagnetic signals having a radio frequency.

6. The mobile cleaning robot of claim 1, wherein the controller is further configured to wirelessly communicate, using the wireless communication component, with a peripheral device in the environment and operate the wireless communication component to cause the peripheral device to activate.

7. The mobile cleaning robot of claim 6, wherein configurations of the controller to operate the wireless communication component to cause the peripheral device to activate comprise configurations to operate the wireless communication component to cause the peripheral device to activate in accordance with a schedule.

8. The mobile cleaning robot of claim 6, wherein configurations of the controller to operate the wireless communication component to cause the peripheral device to activate comprise configurations to operate the wireless communication component to cause the peripheral device to activate when the peripheral device is within a line of sight of the mobile cleaning robot.

9. The mobile cleaning robot of claim 6, wherein configurations of the controller to operate the wireless communication component to cause the peripheral device to activate comprise configurations to operate the wireless communication component to cause the peripheral device to activate from a hibernation state.

10. The mobile cleaning robot of claim 6, wherein configurations of the controller to operate the wireless communication component to cause the peripheral device to activate comprise configurations to cause the peripheral device to activate in response to receiving, by the wireless communication component, a query from the peripheral device.

11. The mobile cleaning robot of claim 6, wherein the peripheral device corresponds to one of the plurality of devices.

12. The mobile cleaning robot of claim 1, wherein one of the plurality of devices comprises a base station to which the mobile cleaning robot docks to recharge a battery of the mobile cleaning robot.

13. The mobile cleaning robot of claim 11, wherein the wireless communication component is further configured to receive identification information of one of the plurality of devices by detecting a corresponding wireless signal emitted by the one of the plurality of devices.

14. The mobile cleaning robot of claim 13, wherein the corresponding wireless signal corresponds to a broadcast signal emitted by the one of the plurality of devices.

15. The mobile cleaning robot of claim 1, wherein the wireless communication component is further configured to transmit, to one of the plurality of devices, a wireless signal indicative of identification information of the mobile cleaning robot.

16. The mobile cleaning robot of claim 1, wherein the wireless communication component is further configured to receive a control signal from one of the plurality of devices, and the controller is configured to control the drive system to move the mobile cleaning robot in accordance with the control signal.

17. The mobile cleaning robot of claim 1, wherein the drive system is further configured to move the mobile cleaning robot through a home while the wireless communication component detects the wireless signals from the plurality of devices in the home.

18. The mobile cleaning robot of claim 1, wherein:
the wireless communication component is further configured to wirelessly communicate with a network and receive a command from a remote user device through the network, and
the controller is further configured to control the drive system to move the mobile cleaning robot in accordance with the command.

19. The mobile cleaning robot of claim 1, wherein configurations of the controller to control the drive system to navigate the mobile cleaning robot about the environment based at least in part on the determined location and the measured strengths of the detected wireless signals comprise configurations to navigate the mobile cleaning robot along a path to a room in the environment based the detected wireless signals.

* * * * *

UNITED STATES PATENT AND TRADEMARK OFFICE
CERTIFICATE OF CORRECTION

PATENT NO.       : 10,182,695 B2
APPLICATION NO.  : 15/880767
DATED            : January 22, 2019
INVENTOR(S)      : Michael J. Halloran et al.

Page 1 of 1

It is certified that error appears in the above-identified patent and that said Letters Patent is hereby corrected as shown below:

On the Title Page

Column 2 (abstract), Line 8, delete "aspect" and insert -- aspect, --, therefor.

On the Second Page:
Column 1 (Related U.S. Application Data), Line 8, delete "and a" and insert -- which is a --, therefor.

In the Claims

Column 34, Line 39, in Claim 19, delete "based" and insert -- based on --, therefor.

Signed and Sealed this
Nineteenth Day of March, 2019

Andrei Iancu
*Director of the United States Patent and Trademark Office*